(12) United States Patent
Bierwagen et al.

(10) Patent No.: US 8,828,494 B2
(45) Date of Patent: Sep. 9, 2014

(54) COATING SYSTEMS FOR METAL SUBSTRATES AND A METHOD FOR PROTECTIVE METAL SUBSTRATES USING THE COATING SYSTEMS

(75) Inventors: Gordon P. Bierwagen, Fargo, ND (US); Dante Battocchi, Fargo, ND (US); Neena Ravindran, Fargo, ND (US); Duhua Wang, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 1016 days.

(21) Appl. No.: 11/992,112

(22) PCT Filed: Sep. 15, 2006

(86) PCT No.: PCT/US2006/035918
§ 371 (c)(1),
(2), (4) Date: Mar. 15, 2008

(87) PCT Pub. No.: WO2007/117270
PCT Pub. Date: Oct. 18, 2007

(65) Prior Publication Data
US 2009/0155598 A1      Jun. 18, 2009

Related U.S. Application Data

(60) Provisional application No. 60/717,529, filed on Sep. 15, 2005.

(51) Int. Cl.
*B05D 7/14*           (2006.01)
(52) U.S. Cl.
USPC ..................... 427/372.2; 427/397.7
(58) Field of Classification Search
USPC .......................................... 427/372.2, 397.7
See application file for complete search history.

(56) References Cited

U.S. PATENT DOCUMENTS

| 2,993,400 A | 4/1960 | Wurbs et al. |
| 4,083,726 A | 4/1978 | Parson et al. |

(Continued)

FOREIGN PATENT DOCUMENTS

| JP | 53-045361 A | 4/1978 |
| JP | 56-102584 A | 8/1981 |

(Continued)

OTHER PUBLICATIONS

Kline, "Inorganic Zinc-rich," Generic Coating Types: An Introduction to Industrial Maintenance Coating Materials, L. Smith, ed., Pittsburgh, Penn: Technology Publication Company (1996), pp. 164-197.

(Continued)

*Primary Examiner* — Elena T Lightfoot
(74) *Attorney, Agent, or Firm* — J.A. Lindeman & Co., PLLC

(57) ABSTRACT

Disclosed are methods of treating a metal to improve the metal's corrosion resistance. In one such method, the method is carried out by applying, to the surface of the metal, a coating which includes magnesium powder and a UV-curable or other radiation-curable binder. In another such method, the method is carried out by applying, to the surface of the metal, a coating which includes magnesium powder and an inorganic binder. In another such method, a coating that includes a magnesium alloy powder and a binder is applied to the surface of the metal. The magnesium alloy powder is selected such that it has a corrosion potential that is from about 0.01 volt to about 1.5 volt more negative than the metal's corrosion potential. Also disclosed are methods of treating a ferrous metals and magnesium alloys to improve the corrosion resistance of these materials.

9 Claims, 12 Drawing Sheets

(56) References Cited

U.S. PATENT DOCUMENTS

| | | | |
|---|---|---|---|
| 4,219,358 A * | 8/1980 | Hayashi et al. | 106/1.17 |
| 4,360,384 A * | 11/1982 | McKaveney et al. | 106/1.12 |
| 6,069,197 A | 5/2000 | Daech et al. | |
| 6,270,884 B1 | 8/2001 | Guhde et al. | |
| 6,632,294 B2 | 10/2003 | Mansfeld et al. | |
| 2005/0161641 A1 | 7/2005 | Gros | |
| 2007/0128351 A1 | 6/2007 | Nanna et al. | |

FOREIGN PATENT DOCUMENTS

| | | |
|---|---|---|
| WO | WO 03/089529 A1 | 10/2003 |
| WO | WO 2005/051551 | 6/2005 |
| WO | 2008/089529 A1 | 7/2008 |

OTHER PUBLICATIONS

Jul. 6, 2012, Office Action in U.S. Appl. No. 10/579,148.
Mar. 21, 2012, Office Action in U.S. Appl. No. 10/579,148.
Sep. 13, 2011, Office Action in U.S. Appl. No. 10/579,148.
Nov. 9, 2010, Office Action in U.S. Appl. No. 10/579,148.

Klein. "Inorganic Zinc-rich," Generic Coating Types: An Introduction to Industrial Maintenance Coating Materials, L. Smith, ed., Pittsburgh, Penn: Technology Publication Company (1996).

Walker, "Organo Silanes as Adhesion Promoters for Organic Coatings," Journal of Coatings Technology, vol. 52, No. 670; pp. 49-61, Nov. 1980.

Van Vliet, "Reduction of zinc and volatile organic solvents in two-pack anti-corrosive primers, a pilot study", Progress in Organic Coatings, 34:220-226 (1998).

Keijman, "High Solids Coatings: Experience in Europe and USA"—Paper 40, Proceedings PCE Conference, The Hague, The Netherlands "Protecting industrial and marine structures with coatings," Mar. 1997.

Bierwagen et al., "Recent Studies of Particle Packing in Organic Coatings," Progress in Organic Coatings, 35:1-9 (1999).

Hale, et al., "Glass Transition Temperature as a Function of Conversion in Thermosetting Polymers", Macromolecules, vol. 24, No. 9, pp. 2610-2621 (1991).

Canadian Intellectual Property Office, Office Action for Application No. 2,545,091 dated Mar. 8, 2011.

\* cited by examiner

COATING SYSTEMS FOR METAL SUBSTRATES AND A METHOD FOR PROTECTIVE METAL SUBSTRATES USING THE COATING SYSTEMS

The present application claims the benefit of U.S. Provisional Patent Application Ser. No. 60/717,529, filed Sep. 15, 2005, which provisional patent application is hereby incorporated by reference.

At least a portion of the present invention was made with the support of the U.S. Air Force Office of Scientific Research Grant No. F49620-99-1-0283 and/or with the support of the U.S. Air Force Research Laboratory Grant No. F49620-02-1-0398. The Federal Government may have certain rights in the subject invention.

FIELD OF THE INVENTION

The present invention is directed, generally, to compositions and methods for preventing or inhibiting corrosion of metals.

BACKGROUND OF THE INVENTION

Many metals are susceptible to corrosion. In this regard, atmospheric corrosion is of particular concern. Such corrosion may affect the performance and/or appearance of the metals affected, and the products produced therefrom. In addition, when polymer coatings such as paints, adhesives, or sealants are applied to the metal, corrosion of the underlying metal may cause a loss of adhesion between the polymer coating and the base metal. A loss of adhesion between the polymer coating and the base metal may similarly lead to corrosion of the metal.

Corrosion of steel and other iron surfaces is a widespread concern and affects a variety of products, such as automobile and other vehicle components, bridge structures, building structures, and the like.

Corrosion of aluminum surfaces is particularly challenging in the aircraft industry.

Corrosion of magnesium alloy surfaces is also becoming of greater concern in view of the increasing use of Mg alloys as light-weight substitutes for iron and steel in a variety of products ranging from automobile engines and wheels to helicopter and other aircraft components.

For these and other reasons, a need remains for methods and products that can be used to prevent or inhibit corrosion of metals, and the present invention, at least in part, is directed to addressing this need.

SUMMARY OF THE INVENTION

The present invention relates to a method of treating a metal to improve the metal's corrosion resistance, said method comprising. The method includes applying, to the surface of the metal, a coating which includes magnesium powder and a radiation-curable binder.

The present invention also relates to a method of treating a metal to improve the metal's corrosion resistance. The method includes applying, to the surface of the metal, a coating which includes magnesium powder and an inorganic binder.

The present invention also relates to a method of treating a ferrous metal to improve the ferrous metal's corrosion resistance. The method includes applying, to the surface of the ferrous metal, a coating which includes magnesium/aluminum alloy powder and a binder, in which the magnesium/aluminum alloy powder includes from about 50% to about 97% by weight of magnesium and from about 3% to about 50% by weight of aluminum.

The present invention also relates to a method of treating a metal to improve the metal's corrosion resistance. The method includes applying, to the surface of the metal, a coating which includes a magnesium alloy powder and a binder, where the magnesium alloy powder has a corrosion potential that is from about 0.01 volt to about 1.5 volt more negative than the metal's corrosion potential.

The present invention also relates to a method of treating a magnesium alloy to improve the magnesium alloy's corrosion resistance. The method includes applying, to the surface of the magnesium alloy, a coating which includes magnesium powder and a binder, in which the magnesium powder includes from about 94% to about 100% by weight of magnesium.

DETAILED DESCRIPTION OF THE INVENTION

Figure 1A:
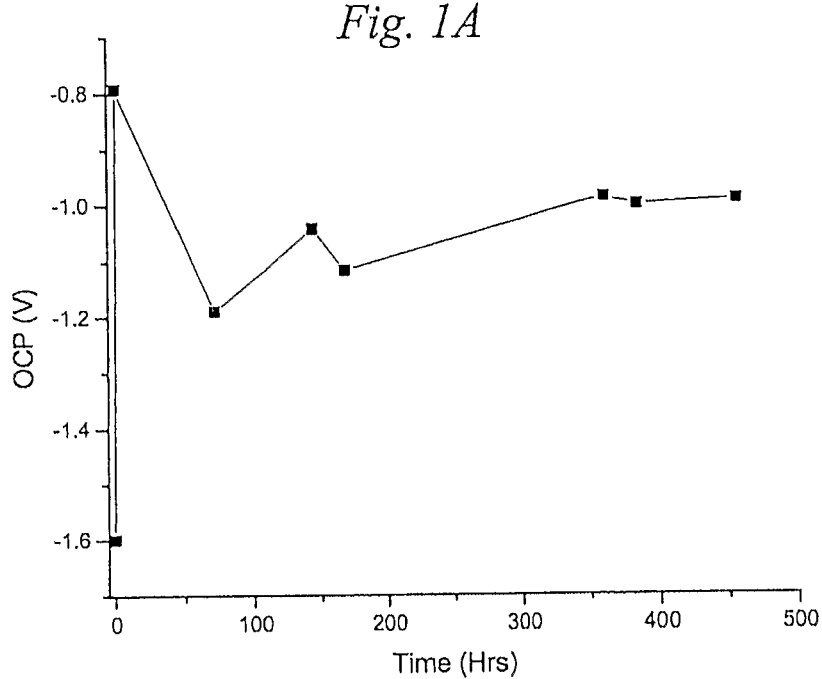
FIG. 1A is a graph of open circuit potential ("OCP") as a function of time in constant immersion in Dilute Harrison's Solution for a UV-curable Mg-rich primer coating formulation in accordance with the present invention.

The present invention relates to methods of treating a metal to improve the metal's corrosion resistance. In one aspect of the present invention, the method includes applying, to the surface of the metal, a coating which includes magnesium powder and a radiation-curable binder. In another aspect of the present invention, the method includes applying, to the surface of the metal, a coating which includes magnesium powder and an inorganic binder. In yet another aspect of the present invention, the method includes applying, to the surface of the metal, a coating which includes a magnesium alloy powder and a binder, where the magnesium alloy powder has a corrosion potential that is from about 0.01 volt to about 1.5 volt more negative than the metal's corrosion potential.

A variety of metals can be protected using the methods of the present invention.

For example, the methods of the present invention can be used to protect aluminum and aluminum alloys. Illustratively, the methods of the present invention can be used to treat aluminum alloys which contain copper (which is meant to include heterogeneous microstructures formed from intermetallic compounds containing copper) and one or more other metals, such as Mg, Fe, and Mn. For example, the methods of the present invention can be used to treat copper-containing aluminum alloys which are commonly used in airplanes and other aircraft, such as Al 2024 alloys (e.g., Al 2024 T-3) and Al 7075 alloys (e.g., Al 7075 T-6). Other aluminum alloys that can be treated using the methods of the present invention include Al 5052 and Al 6061, as well as Al 2011, Al 2014, Al 2017, Al 3003, Al 5005, Al 5083, Al 5086, and Al 6063.

Other metals that can be protected using the methods of the present invention include ferrous metals, e.g., iron and iron alloys (such as galvanized steel and other kinds of steel); copper and copper alloys (such as brass and bronze); tin and tin alloys; metals or metal alloys that are less reactive than magnesium; metals or metal alloys that are less reactive than aluminum; and/or metals or metal alloys that are less reactive than Al 2024 T-3 and/or Al 7075 T-6.

It will be appreciated that the metal being protected can be part of a structure that is made of a number of different metal components. Many such structures include components made of different metals (or alloys) in physical contact with one another. The point or points where different metals are in physically connected is a place where galvanic corrosion is enhanced by the contact of the metals. The high activity of magnesium used in the methods of the present invention, when compared to the activities of most other metals, permits the method of the present invention to be used on substrates made of two or more components of different metals in contact with one another (e.g., an aluminum component in contact with a steel component) without the risk of improving the corrosion resistance of one component while promoting corrosion of another component. As an illustration of such structures containing two or more metals in contact with one another, there can be mentioned a structure that comprises a component made of a first metal (e.g., a metal sheet, such as a sheet made of aluminum or aluminum alloy) and one or more fasteners (e.g., rivets, bolts, nails, cotter pins or other pins, studs, etc.) made of second metal that is different than the first metal, for example, as in the case where the fastener is used to secure the metal sheet or other component to a substrate (e.g., a plastic, wood, metal or other substructure; another sheet of metal; etc.). For example, in one illustrative embodiment, a sheet made of aluminum or aluminum alloy can be fastened with fasteners made of steel, copper, copper alloys, or other metals or metal alloys other than aluminum or aluminum alloy. The point of physical contact between the component and the fastener is a place where galvanic corrosion is enhanced. Frequently, such enhanced galvanic corrosion is reduced by physically isolating the fastener(s) from the metal sheet or other component(s) being fastened, for example, by using a non-conducting material (e.g., plastic, rubber, etc.). Using the method of the present invention, such enhanced galvanic corrosion can be further reduced by applying the coating to the surface of both the sheet and the fastener (e.g., such that the coating applied to the surface of the sheet is unitarily formed with the coating applied to the surface of the fastener) and, in some cases, sufficiently reduced so that physical isolation of the fastener(s) from the metal sheet (e.g., by use of the non-conducting material) is not required.

As used herein, the phrase "improve the metal's corrosion resistance" is meant to be broadly construed and can be ascertained by any suitable qualitative or quantitative method know to those skilled in the art. Illustratively, a metal's corrosion resistance can be determined by Prohesion™ exposure, for example, in accordance with ASTM D5894-96, which is hereby incorporated by reference. Any increase in the metal's corrosion resistance is to be deemed to "improve" its corrosion resistance. Increases in corrosion resistance can be determined, for example, visibly by comparing test samples coated in accordance with the method of the present invention to uncoated test samples or to test samples coated only with topcoat. As indicated above, the level of corrosion resistance can be ascertained qualitatively, as by the visual observation of blistering, peeling, curling, bubbling, or other indicia of coating failure or delamination or by the visual observation of pitting and other indicia of corrosion of the metal. Such observations can be made a single point in time (e.g., after Prohesion™ exposure in accordance with ASTM D5894-96 for about 100 hours, about 200 hours, about 300 hours, about 500 hours, about 800 hours, about 1000 hours, about 1300 hours, about 1500 hours, about 1800 hours, about 2000 hours, about 2500 hours, about 3000 hours, about 3500 hours, about 4000 hours, about 4500 hours, about 5000 hours, etc.), or they can be made over a period of time.

As discussed above, the method of the present invention is carried out by applying, to the surface of the metal, a coating which comprises magnesium powder.

"Magnesium powder", as used herein is meant to refer to a collection of micron-sized particles (e.g., particles having a diameter of about 1-1000 microns, such as of about 10-100 microns, etc.). Illustratively, the micron-sized particles can be particles having a diameter of about 5 microns, of about 8 microns, of about 10 microns, of about 11 microns, of about 12 microns, of about 13 microns, of about 14 microns, of about 15 microns, of about 16 microns, of about 17 microns, of about 18 microns, of about 19 microns, of about 20 microns, of about 21 microns, of about 22 microns, of about 23 microns, of about 24 microns, of about 25 microns, of about 26 microns, of about 27 microns, of about 28 microns, of about 29 microns, of about 30 microns, of about 31 microns, of about 32 microns, of about 33 microns, of about 34 microns, of about 35 microns, of about 38 microns, of about 40 microns, etc. The particles contained in the magnesium powder can be of substantially uniform particles size or not. The particles can be of any suitable shape, such as spherical, ellipsoidal, cuboidal, flake, etc., or combinations thereof.

The particles which contain magnesium metal and/or the oxides thereof can further include one or more other metals or oxides of other metals, as in the case where the magnesium powder is a collection of micron-sized particles of a magnesium alloy (e.g., a magnesium alloy containing (in addition to magnesium) calcium, manganese, lithium, carbon, zinc, potassium, aluminum, silicon, zirconium, tantalum, and/or a rare earth metal (e.g., cerium).

The selection of alloying elements can be used to optimize corrosion resistance. For example, in the case where the metal being protected is aluminum, the magnesium alloy can be chosen so as to be more reactive than aluminum; in the case where the metal being protected is Al 2024 T-3, the magnesium alloy can be chosen so as to be more reactive than Al 2024 T-3; and in the case where the metal being protected is Al 7075 T-6, the magnesium alloy can be chosen so as to be more reactive than Al 7075 T-6.

Corrosion resistance of the metal to be coated can be further optimized by selecting alloying elements such that the magnesium alloy powder has a corrosion potential that is from about 0.01 volt to about 1.5 volt more negative than the corrosion potential of the metal to be coated. In this regard, as used herein, a metal or metal alloy's corrosion potential is to be deemed to be its potential vs. a standard hydrogen electrode under standard conditions. As one skilled in the art will appreciate, a metal or metal alloy's corrosion potential can be (and, in many cases, typically will be) measured against a different electrode (e.g., measured in sea water (3% NaCl) vs. a standard calomel electrode) and then converted to a potential vs. a standard hydrogen electrode using methods known to those skilled in the art. Illustratively, the magnesium alloy powder can have a corrosion potential that is from 0.01 volt to 1.5 volt, from about 0.02 volt to about 1.4 volt, from about 0.03 volt to about 1.3 volt, from about 0.04 volt to about 1.2 volt, from about 0.05 volt to about 1.1 volt, from about 0.07 volt to about 1.1 volt, from about 0.1 volt to about 1 volt, from 0.1 volt to 1 volt, from about 0.2 volt to about 1 volt, and/or from 0.2 volt to 1 volt more negative than the magnesium alloy's corrosion potential. As further illustration, the magnesium alloy powder can have a corrosion potential that is from 0.3 volt to 0.9 volt more negative than the metal's corrosion potential. As further illustration, the magnesium alloy powder can have a corrosion potential that is from 0.4 volt to 0.8 volt more negative than the metal's corrosion potential. As yet further illustration, the magnesium alloy powder can have a corrosion potential that is from 0.6 volt to 0.8 volt more negative than the metal's corrosion potential. As still further illustration, the magnesium alloy powder can have a corrosion potential that is about 0.01 volt, about 0.02 volt, about 0.03 volt, about 0.04 volt, about 0.05 volt, about 0.06 volt, about 0.07 volt, about 0.08 volt, about 0.09 volt, about 0.1, about 0.15 volt, about 0.2 volt, about 0.25 volt, about 0.3 volt, about 0.35 volt, about 0.4 volt, about 0.45 volt, about 0.5 volt, about 0.55 volt, about 0.6 volt, about 0.65 volt, about 0.7 volt, about 0.75 volt, about 0.8 volt, about 0.85 volt, about 0.9 volt, about 0.95 volt, about 1.05 volt, about 1.1 volt, about 1.15 volt, about 1.2 volt, about 1.25 volt, about 1.3 volt, about 1.35 volt, about 1.4 volt, about 1.45 volt, or about 1.5 volt more negative than the metal's corrosion potential.

For example, where the metal to be coated is a ferrous metal (e.g., iron or steel or another iron alloy) having a corrosion potential of from −0.55 volt to −0.75 volt, the magnesium alloy powder can be selected so that it has a corrosion potential of from −0.56 volt to −2.3 volt. As further illustration, where the metal to be coated is titanium or a titanium alloy having a corrosion potential of from 0.1 volt to −0.1 volt, the magnesium alloy powder can be selected so that it has a corrosion potential of from −0.6 volt to −1.6 volt. As still further illustration, where the metal to be coated is aluminum or an aluminum alloy having a corrosion potential of from −0.6 volt to −1 volt, the magnesium alloy powder can be selected so that it has a corrosion potential of from −0.61 volt to −2.5 volt.

Examples of magnesium alloys that can be used in the practice of the present invention include: (i) those which comprise magnesium and manganese, with or without calcium, lithium, carbon, zinc, potassium, aluminum, and/or a rare earth metal (e.g., cerium) being present; (ii) those which comprise magnesium and up to about 6%, by weight, of calcium, manganese, lithium, carbon, zinc, potassium, aluminum, and/or a rare earth metal (e.g., cerium); (iii) those which contain magnesium and up to about 6%, by weight, of manganese; (iv) those which comprise magnesium and up to about 50% (e.g., up to about 45%, up to about 40%, up to about 35%, up to about 30%, up to about 25%, up to about 20%, up to about 18%, up to about 16%, up to about 14%, up to about 12%, up to about 10%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%) by weight, of one or more alloying elements (e.g., calcium, manganese, lithium, carbon, zinc, potassium, aluminum, silicon, zirconium, tantalum, and/or a rare earth metal (e.g., cerium)); and/or (v) those which comprise magnesium and from more than about 6% to about 50% (e.g., from more than 6.5% to about 50%, from 7% to about 50%, from about 7% to about 50%, from about 8% to about 50%, from about 9% to about 50%, from about 10% to about 50%, from more than 6.5% to about 40%, from 7% to about 40%, from about 7% to about 40%, from about 8% to about 40%, from about 9% to about 40%, from about 10% to about 40%, from more than 6.5% to about 30%, from 7% to about 30%, from about 7% to about 30%, from about 8% to about 30%, from about 9% to about 30%, from about 10% to about 30%, from more than 6.5% to about 20%, from 7% to about 20%, from about 7% to about 20%, from about 8% to about 20%, from about 9% to about 20%, from about 10% to about 20%, from more than 6.5% to about 10%, from 7% to about 10%, from about 7% to about 10%, from about 8% to about 10%, and/or from about 9% to about 10%), by weight, of one or more alloying elements (e.g., calcium, manganese, lithium, carbon, zinc, potassium, aluminum, silicon, zirconium, tantalum, and/or a rare earth metal (e.g., cerium)). Examples of suitable magnesium alloy powders include those containing (in addition to magnesium) aluminum; manganese; aluminum and manganese; aluminum, manganese, and zinc; aluminum, manganese, and zirconium; zirconium; zirconium and zinc; cerium and/or other rare earth metals; zirconium and cerium; zirconium and other rare earth metals; etc.

The aforementioned magnesium alloy powders can be substantially free of one or more other elements. Illustratively, the magnesium alloy powders can be substantially free of one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, X, Mn, Tc, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, N, P, As, Sb, Bi, S, Se, Te, and Po. As further illustration, the magnesium alloy powders can contain less than about 5% (e.g., less than 5%, less than about 4%, less than 4%, less than about 3%, less than 3%, less than about 2%, less than 2%, less than about 1%, less than 1%, less than about 0.5%, less than 0.5%, less than about 0.1%, less than 0.1%, less than about 0.05%, less than 0.05%, less than about 0.01%, less than 0.01%, less than about 0.005%, less than 0.005%, less than about 0.001%, less than 0.001%, about zero, and/or zero) of one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, N, P, As, Sb, Bi, S, Se, Te, and Po.

Specific examples of suitable magnesium alloys include those made form magnesium alloy AM60, those made form magnesium alloy AZ91B, and those made form magnesium alloy LNR91.

Mixtures of particles containing magnesium metal and particles containing magnesium alloys can also be employed and are meant to be encompassed by the term "magnesium powder", as used herein. "Magnesium powder", as used herein, is also meant to refer to mixtures of particles containing a first magnesium alloy and particles containing a second magnesium alloy. Illustratively, particles which make up the magnesium powder can include a magnesium metal core or a magnesium alloy core and a coating of magnesium oxide on the surface of the core.

It should be noted, in this regard, that reference here to "diameter" is not to imply that the particles which make up the magnesium powder are necessarily spherical: the particles can be spherical, ellipsoidal, cubical, rod-shaped, disk-shaped, prism-shaped, etc., and combinations thereof. In the case where a particle is other than spherical, "diameter" is meant to refer to the diameter of a hypothetical sphere having a volume equal to that of the particle. Thus, as used herein, "magnesium powder" is meant to include magnesium flake. "Magnesium flake", as used herein, is meant to refer to two-dimensional forms (i.e., forms having two large dimensions and one small dimension) of magnesium particles.

The particles contained in the magnesium powder can be of substantially uniform particle size or not. For example, the magnesium powder can include a mixture of two or more magnesium particle powders, each having different mean particle size distributions, such as in the case where the magnesium powder includes a first magnesium particle powder and a second magnesium particle powder, where the first magnesium particle powder and a second magnesium particle powder have substantially different mean particle size distributions. As used in this context, two mean particle size distributions, X and Y, are to be deemed to be "substantially different" when either the ratio of X:Y or the ratio Y:X is greater than about 1.5, such as greater than about 1.6, greater than about 1.7, greater than about 1.6, greater than about 1.8, greater than about 1.9, greater than about 2, from about 1.1 to about 4, from about 1.5 to about 3, from about 2 to about 2.5, from about 2.1 to about 2.5, and/or from about 2.2 to about 2.4. Additionally or alternatively, the first magnesium particle powder and the second magnesium particle powder can be selected such that the mixture's bulk density is greater than the first magnesium particle powder's bulk density and such that the mixture's bulk density is greater than the second magnesium particle powder's bulk density, for example, as in the case where the mixture's bulk density is at least about 2% greater (e.g., at least about 5% greater, at least about 8% greater, etc.) than the first magnesium particle powder's bulk density and such that the mixture's bulk density is at least about 2% greater (e.g., at least about 5% greater, at least about 8% greater, etc.) than the second magnesium particle powder's bulk density.

As further illustration, the magnesium powder used in the practice of the present invention can include a mixture of a first magnesium particle powder having a mean particle size distribution of from about 25 µm to about 35 µm (such as in the case where first magnesium particle powder has a mean particle size distribution of from about 27 µm to about 33 µm and/or as in the case where the first magnesium particle powder has a mean particle size distribution of about 30 µm) and a second magnesium particle powder having a mean particle size distribution of from about 65 µm to about 75 µm (such as in the case where second magnesium particle powder has a mean particle size distribution of from about 67 µm to about 73 µm and/or as in the case where the second magnesium particle powder has a mean particle size distribution of about 70 µm).

As yet further illustration, the magnesium powder used in the practice of the present invention can include a mixture of a first magnesium particle powder having a mean particle size distribution of from about 25 µm to about 35 µm and a second magnesium particle powder having a mean particle size distribution of from about 65 µm to about 75 µm, where the volume ratio of first magnesium particle powder to second magnesium particle powder is from about 40:60 to about 60:40, for example, as in the case where the volume ratio of first magnesium particle powder to second magnesium particle powder is from about 45:55 to about 55:45; as in the case where the volume ratio of first magnesium particle powder to second magnesium particle powder is from about 50:50 to about 55:45; and/or as in the case where the volume ratio of first magnesium particle powder to second magnesium particle powder is about 58:42.

As yet further illustration, the magnesium powder used in the practice of the present invention can include a mixture of a first magnesium particle powder having a mean particle size distribution of about 30 µm and a second magnesium particle powder having a mean particle size distribution of about 70 µm, where the volume ratio of first magnesium particle powder to second magnesium particle powder is from about 40:60 to about 60:40, for example, as in the case where the volume ratio of first magnesium particle powder to second magnesium particle powder is from about 45:55 to about 55:45; as in the case where the volume ratio of first magnesium particle powder to second magnesium particle powder is from about 50:50 to about 55:45; and/or as in the case where the volume ratio of first magnesium particle powder to second magnesium particle powder is about 58:42.

As discussed above, the method of the present invention is carried out by using a coating which (i) includes the aforementioned magnesium powder and (ii) a binder. The coating can include one or more other materials, such as other metal particles, solvents, and the like, Alternatively, the coating can be free of such one or more other materials. For example, the coating can be substantially free of chromium. As used herein, a coating is to be deemed to be "substantially free of chromium" if the ratio of the weight of chromium metal or ion in the coating to the weight of magnesium metal or ion in the coating is less than 20%, such as less than about 18%, less than about 15%, less than about 12%, less than about 10%, less than about 5%, less than about 2%, less than about 1%, less than about 0.5%, and/or about zero. Additionally or alternatively, the coating can be formulated so as not to contain added chromium.

As discussed above, the coating further (i.e., in addition to the magnesium powder) includes a binder.

"Binder", as used herein, is meant to include any polymeric material (e.g., a polymer or copolymer) or any prepolymer (e.g., a monomer or oligomer) or combination of prepolymers which, upon polymerization or copolymerization, forms a polymer or copolymer. Illustratively, the binder can include a hybrid polymeric matrix or a plurality of hybrid polymeric matrices or other polymer composites or alloys that contain a polymer backbone with at least two types of reactive groups that can take part in crosslinking and network formation under at least two different mechanisms; and/or the binder can contain a prepolymer or combination of prepolymers which, upon polymerization or copolymerization, forms the aforementioned hybrid polymeric matrix, hybrid polymeric matrices, or other polymer composites or alloys.

For example, in one embodiment of the method of the present invention, the binder includes a polyisocyanate prepolymer and an epoxy prepolymer, examples and other details of which are described in International Publication No. WO 2005/051551, which is hereby incorporated by reference.

Other binders that can be used in the practice of the present invention include conducting binders, such as described in International Publication No. WO 2005/051551, which is hereby incorporated by reference.

Other suitable binders include epoxy polyamide polymeric binders. Still other suitable binders include those which polyesters, polyamides, alkyds, acrylics, polyurethanes, and combinations of two or more of these or other polymers.

Still other suitable binders include radiation-curable binders and inorganic binders, as discussed further below.

As discussed above, one aspect of the present invention relates to a method of treating a metal to improve the metal's corrosion resistance in which the method includes applying, to the surface of the metal, a coating which includes magnesium powder and a radiation-curable binder.

As used herein, "radiation-curable binder" is meant to refer to any polymeric material (e.g., a polymer or copolymer) that is formed by radiation curing or a prepolymer (e.g., a monomer or oligomer) or combination of prepolymers that, upon polymerization or copolymerization by exposure to radiation, form a polymer or copolymer. Examples of suitable radiation-curable binders include, for example, binders that can be cured, in whole or in part, by exposure to electromagnetic radiation, such as UV light or visible light. For example, UV-curable binders can be employed. Examples of suitable UV-curable binders include those that which contain one or more acrylic and/or vinyl functional groups, such as acrylic acid esters, examples of which include alkyl acrylates (e.g., methyl acrylate), alkyl methacrylates (e.g., methyl methacrylate), and the like. The UV-curable binder can be a UV-curable binder that is polymerized via a free radical process, a UV-curable binder that is polymerized via a cationic initiation process, or a UV-curable binder that is polymerized via some combination of these or other processes. Examples of suitable UV-curable binders include polyester UV-curable polymers or prepolymers; acrylic UV-curable polymers or prepolymers; epoxy UV-curable polymers or prepolymers; and urethane UV-curable polymers or prepolymers. Mixtures of the aforementioned UV-curable binders and copolymers there of can also be used, and such mixtures and copolymers are meant to be encompassed by the term "UV-curable binder". Illustratively, suitable UV-curable binders also include aromatic urethane acrylates, aliphatic urethane acrylates, polyester acrylates, and epoxy acrylates. It will be appreciated that the UV-curable binder can also include other materials, for example, materials that can aid in processing or influence the properties of the binder. Examples of such other materials include reactive diluents (e.g., mono- di-, or tri-functional reactive diluents), polymerization initiators, polymerization retarders, and the like.

As discussed above, another aspect of the present invention relates to a method of treating a metal to improve the metal's corrosion resistance in which the method includes applying, to the surface of the metal, a coating which includes magnesium powder and an inorganic binder.

Suitable inorganic binders which can be used in the practice of the present invention include those described in Klein, "Inorganic Zinc-rich" in L. Smith ed., *Generic Coating Types: An Introduction to Industrial Maintenance Coating Materials*, Pittsburgh, Pa.: Technology Publication Company (1996), which is hereby incorporated by reference. For example, inorganic binders having a modified $SiO_2$ structure (e.g., produced from silicates or silanes that hydrolyze upon exposure to atmospheric moisture) can be used as inorganic binders.

Examples of suitable inorganic binders include those which are based, in whole or in part, on tetraorthosilicate chemistries. Inorganic binders are meant to include tetraalkoxysilanes (such as tetramethoxysilane and tetraethoxysilane); monoalkyltrialkoxysilanes (such as methyl trimethoxy silane and methyl triethoxy silane); and combinations thereof.

In certain embodiments, the inorganic binder includes one or more of (trialkoxysilyl)alkyl acrylate or methacrylate (e.g., 3-(trimethoxysilyl)propyl methacrylate); a bis((trialkoxysilyl)alkyl)amine (e.g., bis(3-(trimethoxysilyl)propyl)amine; a tris((trialkoxysilyl)alkyl)amine (e.g., tris(3-(trimethoxysilyl)propyl)amine; a tetraalkyl orthosilicate (e.g., tetraethyl orthosilicate, tetramethyl orthosilicate, diethyl dimethyl orthosilicate, etc.); a dialkylphosphatoalkyl-trialkoxysilane (e.g., diethylphosphatoethyl-triethoxysilane); a 1-((trialkoxysilyl)alkyl)urea (e.g., 1-(3-(trimethoxysilyl)propyl)urea); a tris((trialkoxysilyl)alkyl)isocyanurate (e.g., tris((trimethoxysilyl)propyl)isocyanurate; a (glycidoxyalkyl)trialkoxysilane (e.g., γ-(glycidoxypropyl)trimethoxysilane; a (mercaptoalkyl)trialkoxysilane (e.g., (mercaptopropyl)trimethoxysilane; a bis(trialkoxysilyl)alkane (e.g., bis(triethoxysilyl)ethane; and a bis((trialkoxysilyl)alkyl)tetrasulfide (e.g., bis(3-(triethoxysilyl)propyl)tetrasulfide.

In certain embodiments, the inorganic binder includes one or more trialkoxy monoalkyl silanes and one or more tetraalkyl orthosilicates, for example, where the trialkoxy monoalkyl silanes and the tetraalkyl orthosilicates are present in a volume ratio of from about 1:10 to about 10:1 (e.g., from about 1:5 to about 10:1, from about 1:3 to about 10:1, from about 1:2 to about 10:1, from about 1:1 to about 10:1, from about 1:1 to about 8:1, from about 1:1 to about 7:1, from about 1:1 to about 6:1, from about 1:1 to about 5:1, etc.).

As further illustration, in certain embodiments, the inorganic binder includes two or more (e.g., 2, 3, 4, etc.) trialkoxy monoalkyl silanes (e.g., 2, 3, 4, etc.) and one or more (e.g., 1, 2, 3, 4, etc.) tetraalkyl orthosilicates. For example, in one such embodiment, at least one of the trialkoxy monoalkyl silanes can be an amine-containing trialkoxy monoalkyl silane (e.g., bis(3-(trimethoxysilyl)propyl)amine and/or other bis((trialkoxysilyl)alkyl)amines); tris(3-(trimethoxysilyl)propyl)amine and/or other tris((trialkoxysilyl)alkyl)amines); etc.). In another such embodiment, at least one of the trialkoxy monoalkyl silanes is an acrylate-containing or methacrylate-containing trialkoxy monoalkyl silane (e.g., 3-(trimethoxysilyl)propyl methacrylate and/or other (trialkoxysilyl)alkyl acrylates or methacrylates). In yet another such embodiment, at least one of the trialkoxy monoalkyl silanes can be an amine-containing trialkoxy monoalkyl silane (e.g., bis(3-(trimethoxysilyl)propyl)amine and/or other bis((trialkoxysilyl)alkyl)amines); tris(3-(trimethoxysilyl)propyl)amine and/or other tris((trialkoxysilyl)alkyl)amines); etc.) and another of the trialkoxy monoalkyl silanes is an acrylate-containing or methacrylate-containing trialkoxy monoalkyl silane (e.g., 3-(trimethoxysilyl)propyl methacrylate and/or other (trialkoxysilyl)alkyl acrylates or methacrylates).

The present invention also relates to a method of treating a ferrous metal to improve the ferrous metal's corrosion resistance, The method includes applying, to the surface of the ferrous metal, a coating which includes magnesium/aluminum alloy powder and a binder, in which the magnesium/aluminum alloy powder includes from about 50% to about 97% by weight of magnesium and from about 3% to about 50% by weight of aluminum. Illustratively, the magnesium/aluminum alloy powder can include from more than about 6% to about 50% by weight of aluminum; from about 7% to about 50% by weight of aluminum; from about 3% to about 30% by weight of aluminum; from more than about 6% to about 30% by weight of aluminum; from about 7% to about 30% by weight of aluminum; from about 3% to about 15% by weight of aluminum; from more than about 6% to about 15% by weight of aluminum; and/or from about 7% to about 15% by weight of aluminum. The magnesium/aluminum alloy powder can include other alloying elements, such as calcium, manganese, lithium, carbon, zinc, potassium, silicon, zirconium, and/or a rare earth metal. Examples of suitable magnesium/aluminum alloy powders include those containing (in addition to magnesium and aluminum): manganese; manganese and zinc; manganese and zirconium; manganese, zinc, and zirconium; etc.

The aforementioned magnesium/aluminum alloy powders can be substantially free of one or more other elements. Illustratively, the magnesium/aluminum alloy powder can be substantially free of one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, W, Mn, Tc, Re, Fe, Ru, Os, Co; Rh, Ir, Ni, Pd, Pt, Cu, Ag, Au, Zn, Cd, Hg, B, Ga, In, Tl, C, Si, Ge, Sn, Pb, N, P, As, Sb, Bi, S, Se, Te, and Po. As further illustration, the magnesium/aluminum alloy powder can contain less than about 5% (e.g., less than 5%, less than about 4%, less than 4%, less than about 3%, less than 3%, less than about 2%, less than 2%, less than about 1%, less than 1%, less than about 0.5%, less than 0.5%, less than about 0.1%, less than 0.1%, less than about 0.05%, less than 0.05%, less than about 0.01%, less than 0.01%, less than about 0.005%, less than 0.005%, less than about 0.001%, less than 0.001%, about zero, and/or zero) of one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Ga, In, Tl, C, Si, Ge, Sn, Pb, N, P, As, Sb, Bi, S, Se, Te, and Po. Additionally or alternatively, the magnesium/aluminum alloy powder can be selected so as to have a corrosion potential that is from about 0.01 volt to about 1.5 volt (e.g., from 0.01 volt to 1.5 volt, from about 0.02 volt to about 1.4 volt, from about 0.03 volt to about 1.3 volt, from about 0.04 volt to about 1.2 volt, from about 0.05 volt to about 1.1 volt, from about 0.07 volt to about 1.1 volt, from about 0.1 volt to about 1 volt, from 0.1 volt to 1 volt, from about 0.2 volt to about 1 volt, from 0.2 volt to 1 volt, from 0.3 volt to 0.9 volt, from 0.4 volt to 0.8 volt, from 0.6 volt to 0.8 volt, about 0.01 volt, about 0.02 volt, about 0.03 volt, about 0.04 volt, about 0.05 volt, about 0.06 volt, about 0.07 volt, about 0.08 volt, about 0.09 volt, about 0.1, about 0.15 volt, about 0.2 volt, about 0.25 volt, about 0.3 volt, about 0.35 volt, about 0.4 volt, about 0.45 volt, about 0.5 volt, about 0.55 volt, about 0.6 volt, about 0.65 volt, about 0.7 volt, about 0.75 volt, about 0.8 volt, about 0.85 volt, about 0.9 volt, about 0.95 volt, about 1.05 volt, about 1.1 volt, about 1.15 volt, about 1.2 volt, about 1.25 volt, about 1.3 volt, about 1.35 volt, about 1.4 volt, about 1.45 volt, and/or about 1.5 volt) more negative than the ferrous metal's corrosion potential, for example, as in the case where the magnesium/aluminum alloy powder has a corrosion potential of from about −0.6 volt to about −1.7 volt (e.g., a corrosion potential of from −0.6 volt to −1.7 volt, a corrosion potential of from about −0.6 volt to about −1 volt, a corrosion potential of from −0.6 volt to −1 volt, etc.).

Specific examples of suitable magnesium/aluminum alloy powders include those made form magnesium alloy AM60, those made form magnesium alloy AZ91B, and those made form magnesium alloy LNR91.

Suitable binders for use in the practice of this aspect of the present invention include those discussed above. For example, the binder can be a polymeric binder, an epoxy polyamide polymeric binder, an epoxy-polyurethane polymeric binder, a radiation-curable binder, an inorganic binder, or combinations thereof.

The present invention also relates to a method of treating a magnesium alloy to improve the magnesium alloy's corrosion resistance. The method includes applying, to the surface of the magnesium alloy, a coating which includes magnesium powder and a binder, in which the magnesium powder includes from about 94% to about 100% by weight of magnesium As noted above, the magnesium powder used to treat magnesium alloys to improve magnesium alloys' corrosion resistance includes from about 94% to about 100% by weight of magnesium. For example, the magnesium powder can include from 94% to 100% by weight of magnesium, from about 94.5% to about 100% by weight of magnesium, from about 95% to about 100% by weight of magnesium, from about 95.5% to about 100% by weight of magnesium, from about 96% to about 100% by weight of magnesium, from about 96.5% to about 100% by weight of magnesium, from about 97% to about 100% by weight of magnesium, from 97% to 100% by weight of magnesium, from about 97.5% to about 100% by weight of magnesium, from about 98% to about 100% by weight of magnesium, from about 98.5% to about 100% by weight of magnesium, from about 99% to about 100% by weight of magnesium, from about 99.5% to about 100% by weight of magnesium, about 99.5% by weight of magnesium, substantially no metal other than magnesium, no added metal other than magnesium, and or about 100% by weight of magnesium. In certain embodiments, the magnesium powder is substantially free from one or more of calcium, manganese, lithium, carbon, zinc, potassium, silicon, zirconium, and rare earth metals. In other embodiments, the magnesium powder is substantially free from calcium, manganese, lithium, carbon, zinc, potassium, silicon, zirconium, and rare earth metals. In certain embodiments, the magnesium powder has a corrosion potential that is from about 0.01 volt to about 1.5 volt (e.g., from 0.01 volt to 1.5 volt, from about 0.02 volt to about 1.4 volt, from about 0.03 volt to about 1.3 volt, from about 0.04 volt to about 1.2 volt, from about 0.05 volt to about 1.1 volt, from about 0.07 volt to about 1.1 volt, from about 0.1 volt to about 1 volt, from 0.1 volt to 1 volt, from about 0.2 volt to about 1 volt, from 0.2 volt to 1 volt, from 0.3 volt to 0.9 volt, from 0.4 volt to 0.8 volt, from 0.6 volt to 0.8 volt, about 0.01 volt, about 0.02 volt, about 0.03 volt, about 0.04 volt, about 0.05 volt, about 0.06 volt, about 0.07 volt, about 0.08 volt, about 0.09 volt, about 0.1, about 0.15 volt, about 0.2 volt, about 0.25 volt, about 0.3 volt, about 0.35 volt, about 0.4 volt, about 0.45 volt, about 0.5 volt, about 0.55 volt, about 0.6 volt, about 0.65 volt, about 0.7 volt, about 0.75 volt; about 0.8 volt, about 0.85 volt, about 0.9 volt, about 0.95 volt, about 1.05 volt, about 1.1 volt, about 1.15 volt, about 1.2 volt, about 1.25 volt, about 1.3 volt, about 1.35 volt, about 1.4 volt, about 1.45 volt, and/or about 1.5 volt) more negative than the magnesium alloy's corrosion potential.

A variety of magnesium alloys can be treated in accordance with the method of the present invention. For example, the magnesium alloy can be one that includes from about 2% to about 15% of aluminum and from about 85% to about 97% of magnesium; the magnesium alloy can be one that includes from about 3% to about 10% of aluminum and from about 90% to about 97% of magnesium; the magnesium alloy can be one that includes from about 5% to about 10% of aluminum and from about 90% to about 95% of magnesium. Specific examples of magnesium alloys that can be treated in accordance with the method of the present invention include AM60, AZ31, AZ61, AZ63, AZ80, AZ91, EZ33, ZM21, HK31, HZ32, QE22, QH21, ZE41, ZE63, ZK40, AND ZK60. In one embodiment, the magnesium alloy to be treated is AM60. In another embodiment, the magnesium alloy to be treated is AZ91. In still other illustrative embodiments, the magnesium alloy to be treated has a corrosion potential of from about −1.3 volt to about −1.75 volt, such as from about −1.4 volt to about −1.75 volt, from about −1.3 volt to about −1.7 volt, from about −1.4 volt to about −1.75 volt, from −1.3 volt to −1.75 volt, from −1.4 volt to −1.75 volt, from −1.3 volt to −1.7 volt, from −1.4 volt to −1.75 volt, etc.

Suitable binders for use in the practice of this aspect of the present invention include those discussed above. For example, the binder can be a polymeric binder, an epoxy polyamide polymeric binder, an epoxy polyurethane polymeric binder, a radiation-curable binder, an inorganic binder, or combinations thereof.

As discussed above, the methods of the present invention are carried out by applying the coatings discussed above to the surface of the metal whose corrosion resistance is to be improved.

The coating can be applied in the form of a suspension, dispersion, or solution in a suitable solvent or combination of solvents, examples of which include ketones (e.g., acetone, methyl ethyl ketone, etc.), aromatic hydrocarbon solvents (e.g., toluene, xylenes, etc.), alkane solvents (e.g., hexane, pentane, etc.), polypropylene carbonate, ethyl-3-ethoxypropionate ("EEP"), and combinations thereof. Application can be carried out, for example, by any suitable technique, such as spraying (e.g., airless spraying or spraying with the use of air), brushing, rolling, flooding, immersion, etc., to achieve a suitable coating thickness, such as from about 10 to about 200 microns, from about 10 to about 150 microns, from about 10 to about 100 microns, from about 30 to about 150 microns, from about 30 to about 100 microns, from about 30 to about 80 microns, from about 40 to about 150 microns, from about 40 to about 100 microns, from about 40 to about 60 microns, from about 40 to about 60 microns, about 120 microns, about 110 microns, about 100 microns, about 90 microns, about 80 microns, and/or about 50 microns.

The coating can be applied directly to the metal's surface, or it can be applied indirectly to the metal's surface, for example, as discussed in International Publication No. WO 2005/051551, which is hereby incorporated by reference.

The methods of the present invention can also include contacting the binder with a crosslinker. Examples of suitable crosslinkers and methods for their use are described in and other details of which are described in International Publication No. WO 2005/051551, which is hereby incorporated by reference.

Once applied to the metal surface, for example, as described above, the coating (i.e., the coating formulation containing magnesium powder, binder, etc.) can be cured, for example, for from about 1 hour to about 1 month (such as for about 2 hours, for about 8 hours, for about 12 hours, for about 18 hours, for overnight, for about a day, for about two days, for about a week, for about two weeks, etc.) at a temperature of from about room temperature to about 50° C., such as at from about 30° C. to about 40° C. and/or at about 35° C. In the case where a radiation-curable binder is used, the coating (i.e., the coating formulation containing magnesium powder, binder, etc.) can be cured by exposing the coating to suitable radiation (e.g., UV light, such as UV light having a wavelength or wavelengths in the range from 100 nm to 405 nm for from about 1 second to about 5 minutes (such as for about 2 seconds, for about 5 seconds, for about 10 seconds, for about 30 seconds, for about 1 minute, for from about 10 seconds to about 1 minute, for about 2 minutes, for about 3 minutes, etc.) at any suitable temperature, such as at room temperature. In the case where an inorganic binder is employed, the coating (i.e., the coating formulation containing magnesium powder, binder, etc.) can be cured by an suitable technique, such as by exposing the coating to temperatures of from about 70° C. to about 150° C. (e.g., of from about 90° C. to about 120° C. or of about 100° C.) for from about 1 hour to about 1 month (e.g., for from about 8 hours to about 1 week, for about 4 hours, for about 8 hours, for about overnight, for about 12 hours, for about 16 hours, for about 1 day, for about 2 days, for about 3 days, for about 5 days, for about 1 week, etc.); such as by exposing the coating to a temperature of about 100° C. for about 12-20 hours or overnight; and/or such as by exposing the coating to about room temperature for about a week.

The coating can be top coated using any compatible topcoat formulation, such as Extended Lifetime™ Topcoat, for example by spraying or brushing to achieve a topcoat thickness of from about 20 to about 200 microns, such as from about 50 to about 150 microns, from about 80 to about 120 microns, and/or about 100 microns.

The coating can include, in addition to magnesium powder and binder, other materials, such as various organic or inorganic materials. Illustratively, the coating can include other metals or metal-containing compounds. In certain embodiments, the coating can include other metals or metal-containing compounds that include one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, N, P, As, Sb, Bi, S, Se, Te, and Po. In certain other embodiments, the coating can be substantially free of such other metals or metal-containing compounds. Illustratively, the coating can be substantially free of other metals or metal-containing compounds (except for metals or metal-containing compounds (if any) that may be alloyed with the magnesium in the magnesium powder) that contain one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, N, P, As, Sb, Bi, S, Se, Te, and Po. As further illustration, other than metals or metal-containing compounds (if any) that may be alloyed with the magnesium in the magnesium powder, the coating can contain less than about 5% (e.g., less than 5%, less than about 4%, less than 4%, less than about 3%, less than 3%, less than about 2%, less than 2%, less than about 1%, less than 1%, less than about 0.5%, less than 0.5%, less than about 0.1%, less than 0.1%, less than about 0.05%, less than 0.05%, less than about 0.01%, less than 0.01%, less than about 0.005%, less than 0.005%, less than about 0.001%, less than 0.001%, about zero, and/or zero) of one or more (e.g., one, two, three, more than three, more than four, all but two, all but one, all, etc.) of Be, Ca, Sr, Ba, Ra, Sc, Y, Ce, Pr, Nd, Pm, Sm, Eu, Gd, Tb, Dy, Ho, Er, Tm, Yb, Lu, Th, Pa, U, Np, Pu, Am, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, N, P, As, Sb, Bi, S, Se, Te, and Po. In one embodiment, the coating further includes a rare earth metal, such as cerium. The cerium can be present in the form of cerium metal, cerium oxides, cerium salts, or combinations thereof. The cerium can be applied to the magnesium powder or a portion thereof, for example in the form cerium nitrate or other cerium salt. For example, in cases where the magnesium powder includes a mixture of two or more magnesium particle powders, each having different mean particle size distributions, such as in the case where the magnesium powder includes a first magnesium particle powder and a second magnesium particle powder, where the first magnesium particle powder's mean particle size distributions is less than 20 μm and where the second magnesium particle powder's mean particle size distributions is greater than 20 μm, the cerium can be applied to the surface of the first magnesium particle powder but not to the second magnesium particle powder. Additionally, or alternatively, the cerium metal, oxide, or salt can be dispersed in a binder used in the coating. Still additionally or alternatively, the cerium metal, oxide, or salt can be applied to the metal surface, e.g., in the form of cerium nanoparticles, prior to applying the coating thereto, for example, as in the case where the method of the present invention further includes a step of pretreating the surface of the metal with cerium ion. These and further details with regard to the use of cerium can be found in International Publication No. WO 2005/051551, which is hereby incorporated by reference.

Certain aspects of the present invention are further illustrated with the following examples.

EXAMPLES

Example 1

Preparation and Characterization of Magnesium-Rich Radiation Curable Coatings

An unsaturated polyester was used as a UV-curable binder for two magnesium-rich primer formulations (20% PVC and 40% PVC).

The polyester UV-curable magnesium-rich primer formulations were prepared from 2.66 g of unsaturated polyester, 1.01 g triethyleneglycoldivinylether (BASF, TEG DVE), 0.13 g of photoinitiator (Ciba, Darocur 1173), and either 0.68 g (20% PVC) or 1.37 g (40% PVC) of Mg powder (Ecka granules, Mg 3820).

The 20% PVC and 40% PVC polyester formulations were coated on Al 2024 T3 panels and cured by exposure to UV radiation. Despite the heavy loading of magnesium, both polyester formulations cured, and mechanically stable films of thicknesses of about 100 microns were obtained.

Figure 1B:
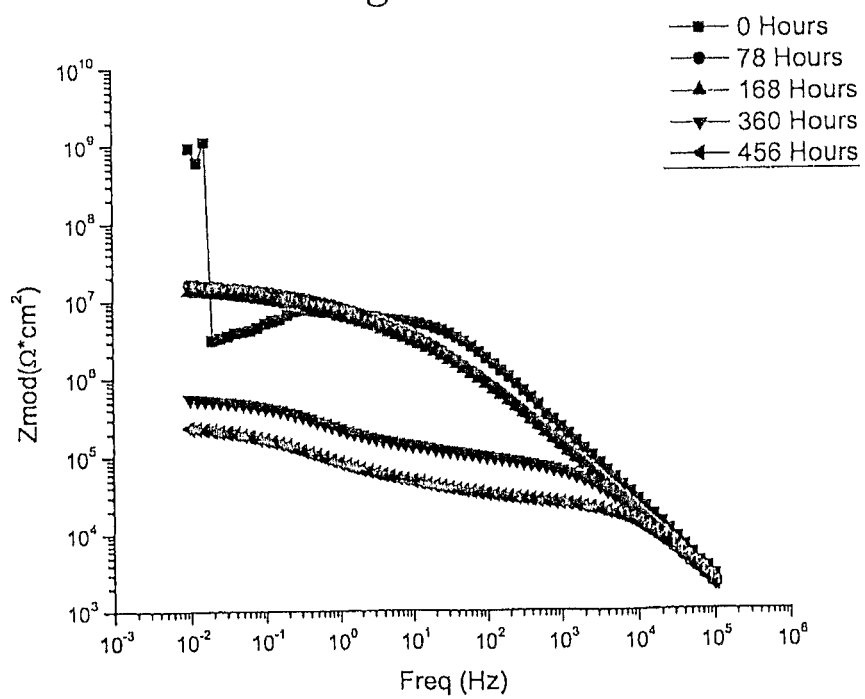
FIG. 1B is a graph showing |Z| modulus as a function of frequency at various times of a UV-curable Mg-rich primer coating formulation in accordance with the present invention in constant immersion in Dilute Harrison's Solution.

Referring to FIG. 1A, the coatings showed good open-circuit potential ("OCP") in constant immersion experiments using Dilute Harrison's Solution, showing that the Mg in the coating is in contact with the aluminum substrate. Performance in exposure chamber experiments were not as good. Impedance studies in constant immersion using Dilute Harrison's Solution indicated that the primer initially provided protection to the substrate but that the protection is only temporary, as shown in FIG. 1B.

In a separate series of experiments, an unsaturated acrylic system was used as a UV-curable binder for two magnesium-rich primer formulations (20% PVC and 40% PVC).

The acrylic UV-curable magnesium-rich primer formulations were prepared from 2 g of polyoxyethylene tetraacrylate (Sartomer, SR494), 2 g of acrylate oligomer (Sartomer, CN929), 0.16 g of photoinitiator (Ciba, Darocur 1173), and either 0.68 g (20% PVC) or 1.37 g (40% PVC) of Mg powder (Ecka granules, Mg 3820).

The 20% PVC and 40% PVC formulations were coated and cured by exposure to UV radiation. Again. despite the heavy loading of magnesium, both formulations cured, and mechanically stable films were obtained.

Example 2

Development of Inorganic Binders for Magnesium-Rich Primers

In order for the magnesium particles to provide optimal cathodic protection of an aluminum alloy substrate, it is believed that they should be in electrical contact with the substrate. The silicate binder is electrically insulating and protects aluminum surfaces against corrosion. The magnesium particles in magnesium silicate primer may then be protected by the silicate and insulated from the aluminum surface. Magnesium silicates can be pigmented above the critical pigment volume concentration ("CPVC"). When pigmenting above the CPVC, the binder is not able to wet all the pigment particles, and there will be pores between the particles. This may be an advantage in magnesium-rich primers, since the presence of an electrolyte at the magnesium particle surface may enhance the anodic reaction and could also provide better adhesion, cohesion, and overcoatability with topcoat.

The traditional inorganic silicate, the tetraethyl orthosilicate ("TEOS"), though not an organic silicate, still can be used as film formation material, especially as the binder of the zinc-rich primers. TEOS could undergo hydration and condensation processes and form polysiloxane network in the air. The structure of polysiloxane is very complex, and its final hydration products are $SiO_2$ and water. The basic process is the hydration into silanol and condensation in the acidic condition. The film formed from TEOS only is usually brittle and other additives, for example, polyvinylbutyral ("PVB") can be added in the formula to improve the ductility of the film. It is believed that the incorporation of organic groups could make it possible to increase ductility and thickness and to reduce the micro-cracks, thus enhancing the electrolytic anti-corrosion performance. Several organic silanes, such as bis[3-(trimethoxysilyl)propyl)amine, 3-methacryloxypropyl-trimethoxysilane ("MAPTS"), and diethylphosphatoethyl-triethoxysilane, could be used, together with TEOS, as the binder for the magnesium particles.

Three coating formulations were prepared using the following materials: 3-(trimethoxysilyl)propyl methacrylate, 98% (M); tetraethyl orthosilicate, 99% (T); bis[3-(trimethoxysilyl)-propyl)amine, 90+% (B); ethyl alcohol (ethanol) 95%, denatured; and 0.05 molar acetic acid solution. In all of the formulations, the mole ratio of M to T was 4:1, and the mole ratio of B to M+T was 1:9. 50 ml of ethanol were placed into a glass jar. The jar was placed onto a magnetic stirrer, and the solution was stirred for about one hour. A small amount of 0.05M acetic acid was added to the ethanol solution, and the temperature of the solution was increased to 60±2° C. Chemical M and T were added to the solution, and stirring was continued at 60° C. for 1.5 hr. The jar was capped, and allowed to cool to ambient temperature to form a sol solution. Chemical B was added to the sol solution about 2 hr before adding magnesium particles. Mg particles (Ecka granules, Mg 3820) were then added to the sol-solution, and stirring was continued for at least 0.5 hour for good dispersion of particles.

The resulting primers were sprayed onto Al 2024 T-3 panels, which had been previously sanded with 600 grit sanding paper and then cleaned by ethanol. The coated panels were put into oven at 100° C. for 15 hr. The panels were then cooled and, once cooled, were ready for testing.

Details regarding the coating formulations are set forth in Table 1.

TABLE 1

|  | BMT501-20 | BMT501-40 | BMT501-60 |
| --- | --- | --- | --- |
| PVC | 20% | 40% | 60% |
| M | 25.5 ml | 19.1 ml | 12.7 ml |
| T | 6.0 ml | 4.5 ml | 3.0 ml |
| B | 4.9 ml | 3.7 ml | 2.5 ml |
| Ethanol | 50 ml | 50 ml | 50 ml |
| 0.5 M Acetic Acid | 0.7 ml | 0.6 ml | 0.4 ml |
| Mg particles | 7.0 g | 13.9 g | 20.9 g |
| Total volume | 100 ml | 100 ml | 100 ml |
| Coating Thickness | 35 ± 3 μm | 65 ± 6 μm | 98 ± 10 μm |

In addition, a fourth Al 2024 T-3 panel was coated with a sol-solution containing no magnesium particles, The silicate clear coat panel had a coating thickness of 30±5 μm and a PVC of zero.

Thermal stability of the silicate clear coat was evaluated by thermogravimetry ("TG"). The TG curve showed only one weight loss during the heat treatment. There was no appreciable weight loss before 100° C., which would have been attributed to the volatilization of solvent (ethanol) and water. Stability at a temperature of around 240° C. was enhanced, probably due to the further condensation reaction between Si—OH together with the pyrogenic decomposition of organic components, especially the decomposition of organic groups incorporated by MAPTS in the formula.

FTIR-photoacoustic spectroscopy of the silicate clear coat showed C—H and C═O stretching bands, attributed to the organic components in the silicate. An absorption band in the region of 1000 cm$^{-1}$ to 1200 cm$^{-1}$ was observed, and this is believed to correspond to Si—O—Si stretching. It was reported that the absorption peak of Al—O—Si bonds should also be 1046 cm$^{-1}$ or 1014 cm$^{-1}$ in the silane pretreated aluminum system. This Al—O—Si was favorable for a stronger adhesion to the Aluminum alloy substrate.

Wet adhesion experiments were conducted by immersing the panels into deionized ("DI") water for 24 hrs, after which the panels were removed from the DI water and cross-scribed. All the samples showed no cracks and good adhesion. The high PVC sample (60%) showed white areas on the surface, which may be due to a reaction of the Mg particles with water during the immersion.

Scanning electron microscopy ("SEM") was used to observe the microstructure of the coatings' surfaces and cross-sections. The surface of the low PVC primer (20%) showed micro cracks, and Mg particles were buried into the binder, perhaps due to the high volume of silicate binder present. In contrast, the high PVC primer (60%) showed much rougher surface that was covered by Mg particles, which may form pores through the coat. The cross-sectional SEM images also showed the differences in thickness and uniformity of these two primers.

Potentiodynamic polarization experiments were carried out on bare aluminum and on the 0%, 20%, 40%, and 60% PVC panels. The silicate clear coated panel (0% PVC) provided a barrier property to the bare aluminum. All three Mg-rich primers offered cathodic protection to the substrate. The corrosion potential was around −1.4 VSCE, which is between pure magnesium and aluminum 2024 T-3. The low PVC primer (20% PVC) appeared to be best, probably due to the high fraction of binder offering a better barrier property.

Figure 2A:
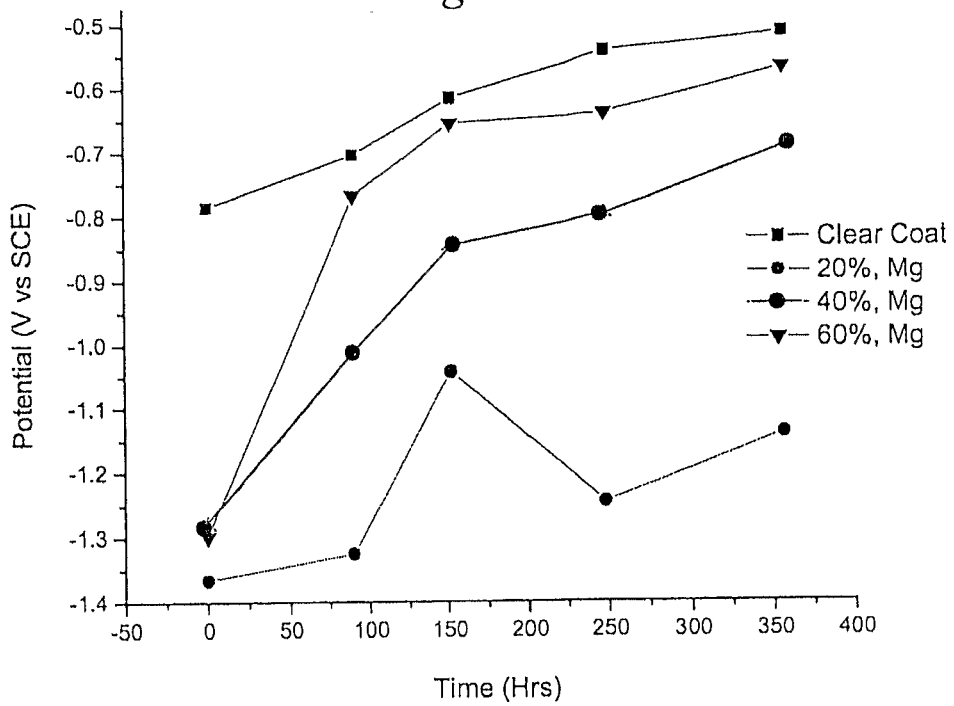
FIGS. 2A and 2B are graphs showing changes in OCP that occurred during exposure of various Mg-rich primer coating formulations containing inorganic binders in accordance with the present invention in Prohesion (FIG. 2A) and B117 (FIG. 22) corrosion chambers.
Figure 2B:
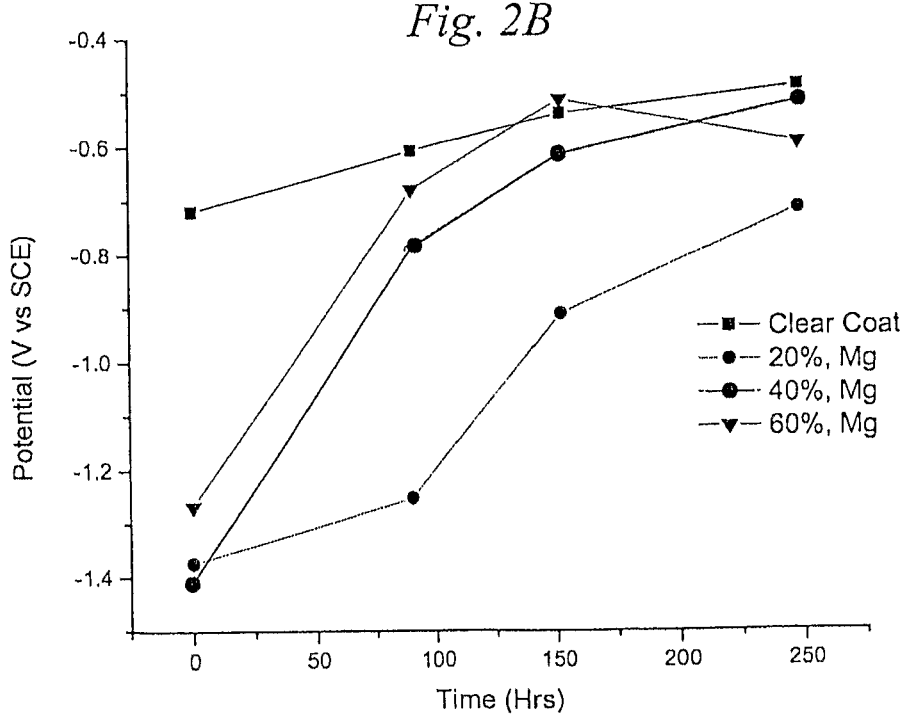

The 0%, 20%, 40%, and 60% PVC panels were scribed in an "X" pattern (scribe length of 5 cm) and the scribed panels were exposed in Prohesion and B117 corrosion chambers for about 400 hours, OCP changes were monitored during exposure in the Prohesion and B117 corrosion chambers. The OCP changes that occurred during exposure in the corrosion chambers are presented in graphical form in FIG. 2A (Prohesion) and FIG. 2B (B117). Visual inspection of the panels and analysis of the OCP experiments reveal that all of the Mg primers (20%, 40%, and 60% PVC) provided corrosion protection greater than that provided by the silicate clear coat, The lower PVC primer (20%) exhibited better corrosion protection, despite its low thickness, and this observation is believed to be due to the fact that the panels were not topcoated. In general, we have observed that untopcoated samples tend to perform better at low PVC, since low PVC samples have a higher level of binder which is believed to provide better barrier protection. The higher PVC primers were thicker but may have pores through the coating that may accelerate the anodic reaction and consume magnesium particles more quickly. Conducting OCP and corrosion chamber experiments with topcoated panels at varying PVCs will readily permit optimization of the system.

Example 3

Development of Magnesium-Rich Primers for Ferrous Substrates

Coatings containing particles of three different Mg alloys were used to investigate the effect of primers containing Mg alloys on the corrosion of ferrous substrates. AM60, AZ91B, and LNR91 magnesium alloy were used in the coatings. AM60 alloy contains about 5% aluminum, AZ91B alloy contains about 9% aluminum, and LNR91 alloy contains about 50% aluminum.

The coatings were prepared by dispersing AM60 (particle size diameter of about 63 microns), AZ91B (particle size diameter of about 59 microns), and LNR91 (particle size diameter of about 56 microns) magnesium alloy particles in an epoxy polyamide binder at PVCs of from about 30% to 50%. The coatings were applied to low carbon steel panels by spraying, and the coated panels were put into oven at about 60° C. for about 3 hours. The panels were then cooled and, once cooled, were ready for testing. The coatings had a thicknesses of about 80-100 microns.

A typical formulation (45% PVC) was prepared by mixing Parts A and B. Part A contained: 32.06 g of EPON™ Resin 828 (available from Resolution Performance Produce, Houston, Tex.); 1.78 g of TEXAPHOR™ 963 Dispersant (available from Cognis Corporation, Cincinnati, Ohio); 7.06 g of CAB-O-SIL™ TS-720 (available from Cabot Corporation); 85.99 g of Mg particles; 5.81 g of BEETLE™ 216-8 (available from Cytec Industries, Inc.); 5.99 g of MIBK (available from Shell Chemical Co.); 5.93 g of Acetone (available from Shell Chemical Co.); and 40.75 g of AROMATIC™ 100 (available from Exxon Chemical Co.). Part B contained: 43.39 g of EPI-CURE™ Curing Agent 3164 (available from Resolution Performance Produce, Houston, Tex.); 0.72 g of CAB-O-SIL™ TS-7620 (available from Cabot Corporation); 22.68 g of NICRON™ 402 talc (available from Luzenac America, Itaska, Ill.); 3.95 g of acetone (available from Shell Chemical Co.); and 3.83 g of n-butanol (available from Shell Chemical Co.).

Figure 3A:
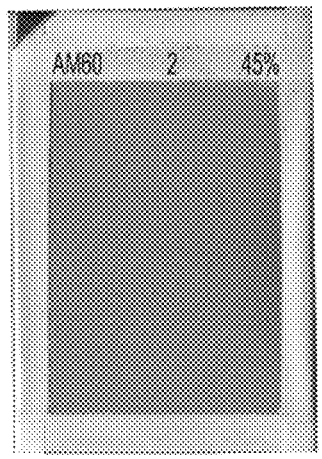
FIGS. 3A-3C are images of scribed ferrous metal substrate panels coated with AM60 magnesium alloy particles at 45% PVC in accordance with the present invention after 24-hour (FIG. 3A), 66-hour (FIG. 3B), and 265-hour (FIG. 3C) exposure in a B117 corrosion chamber.
Figure 3B:
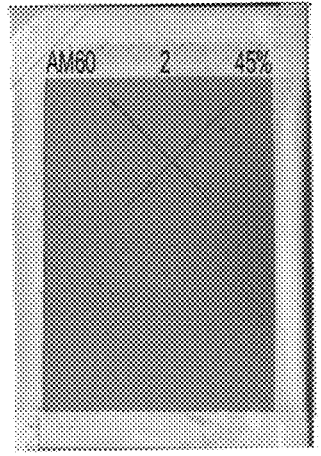
Figure 3C:
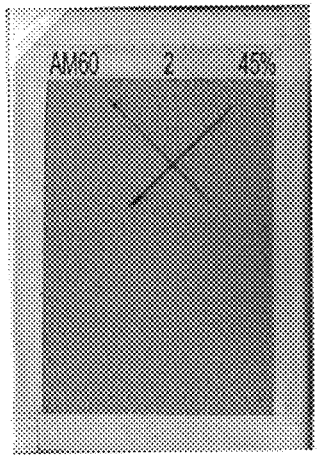

The panels were scribed in an "X" pattern (scribe length of 5 cm), and the scribed panels were exposed in B117 corrosion chambers for about 300 hours. Images of a panel coated with AM60 magnesium alloy particles at 45% PVC after 24-hour, 66-hour, and 265-hour B117 exposure are shown in FIGS. 3A-3C, respectively.

Visual inspection of the AM60-coated panels showed that the AM60 coating provided corrosion protection for about 200 hours. Visual inspection of the AZ91B-coated and LNR91-coated panels showed that the AZ91B coating also provided corrosion protection for about 200 hours, while the LNR91 coating provided corrosion protection for about 50 hours. Of the PVCs used, 45% PVC showed the best corrosion protection.

Figure 3D:
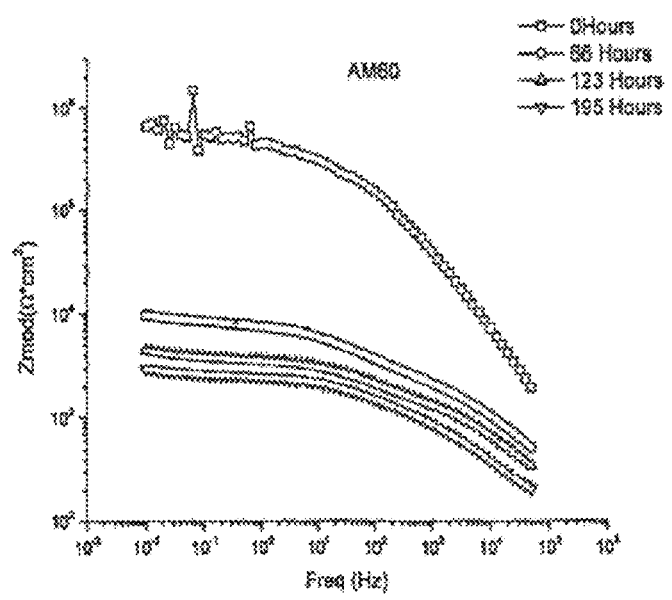
FIGS. 3D and 3E are graphs showing |Z| modulus as a function of frequency at various exposure times in a B117 corrosion chamber for ferrous metal substrate panels coated with Mg-rich primers formulated with AM60 (FIG. 3D) and AZ91B (FIG. 3E) magnesium alloy particles in accordance with the present invention.
Figure 3E:
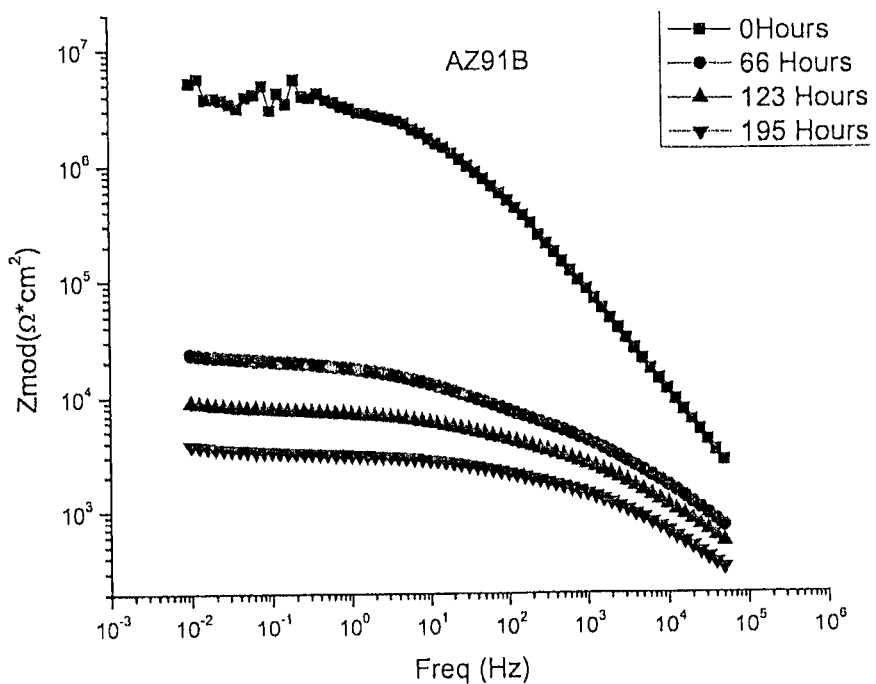
Figure 3F:
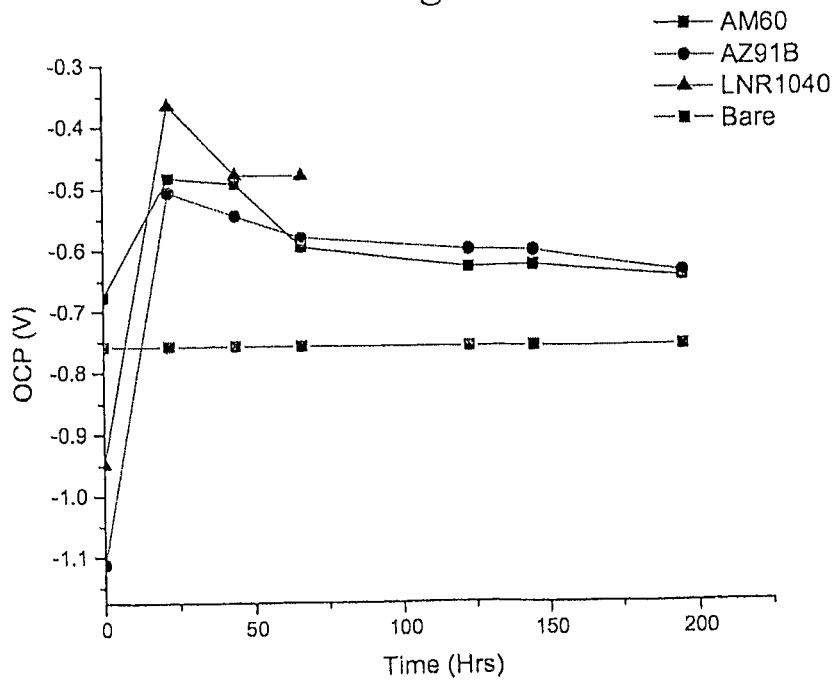
FIG. 3F is a graph showing OCP changes that occurred during B117 exposure of ferrous metal substrate panels coated with Mg-rich primers formulated with AM60, AZ91B, and LNR91 magnesium alloy particles in accordance with the present invention.

The aluminum content in the magnesium alloy particles appears to have two distinct contributions: (1) at low aluminum content, the magnesium alloy behaves similarly to pure Mg but has an OCP that is slightly lower; and (2) at high aluminum content, the effect of the aluminum appears to be detrimental. Graphs showing |Z| modulus as a function of frequency at different exposure times (B117) for Mg-rich primers formulated with AM60 and AZ91B magnesium alloy particles are shown in FIGS. 3D and 3E. OCP changes were monitored during exposure in the B117 corrosion chamber, and the results for the AM60, AZ91B, and LNR91 coatings (along with results for bare substrate) are shown in FIG. 3F.

Example 4

Development of Magnesium-Rich Primers for Magnesium Alloy Substrates

Mg rich primer was applied on AZ91B magnesium alloy to investigate the possibility of providing cathodic protection on magnesium alloy substrates. The close proximity of the OCP of magnesium alloys and pure Mg particles suggest that the pure Mg particles may yield short term protection. However, even short term protection would be valuable and suggests that, through optimization, longer term protection can be achieved.

Mg rich primer was prepared at 50% PVC in a silane modified epoxy isocyanate hybrid binder, as described in International Publication No. WO 2005/051551, which is hereby incorporated by reference. The Mg rich primer was applied to the surface of AZ91B magnesium alloy panels by spraying; and the coated panels were put into oven at 60° C. for 3 hours. The panels were then cooled and, once cooled, were ready for testing. The coatings had a thicknesses of about 50-80 microns. It was noted that, as an alternative to oven curing, curing could be achieved overnight at room temperature. Nine coated panels were weathered in the B117 exposure chamber (5% NaCl constant fog) for over 1200 hours, and the panels were characterized by OCP and EIS monitoring, as well as by periodic visual inspections.

The OCP experiments showed that the OCP was highly unstable, with considerable fluctuation, as one might expect for extremely active substrates, such as the Mg alloy substrates used in these experiments. Nevertheless, the overall OCP behavior was encouraging and leaves room for optimization.

Figure 4A:
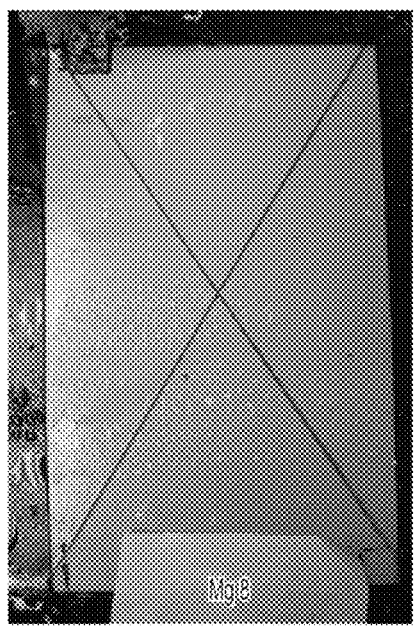
FIGS. 4A and 4B are images of two AZ91B Mg alloy substrate panels coated with Mg-rich primer in accordance with the present invention after 2275 hours of exposure in a B117 corrosion chamber.
Figure 4B:

Visual inspection showed that a majority of the samples exposed to weathering maintained a high degree of protection, as shown by the appearance of the scribed areas shown in FIGS. 4A and 4B. FIGS. 4A and 4B are images of two AZ91B Mg alloy substrate panels coated with Mg-rich primer after 2275 hours of weathering.

Figure 4C:
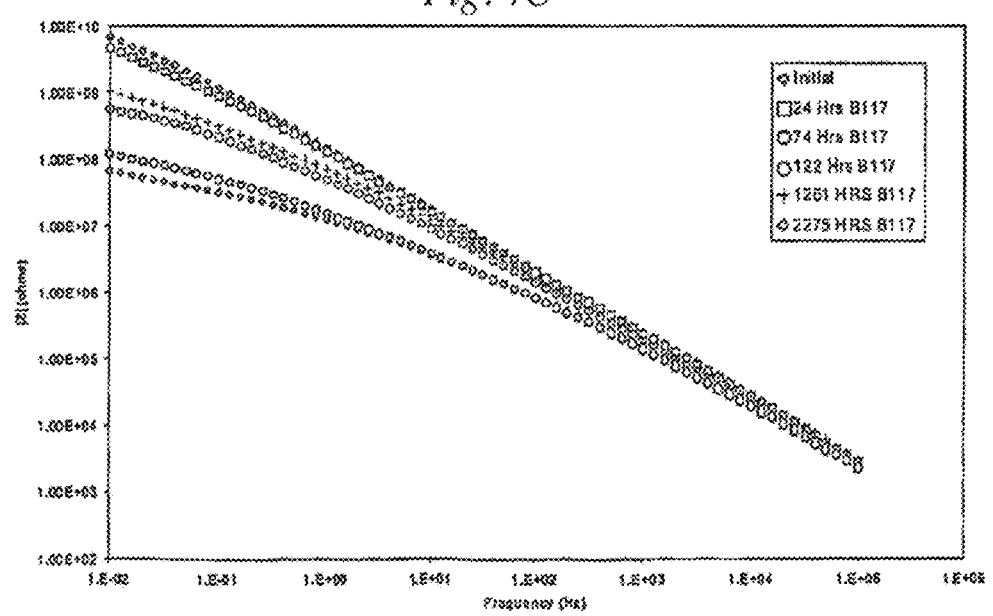
FIG. 4C shows the evolution of the modulus of the electrochemical impedance as a function of frequency at various times while the panels were exposed to B117 weathering.

FIG. 4C shows the evolution of the modulus of the Electrochemical Impedance as a function of frequency over time as the samples were exposed to B117 weathering. Initially, the behavior is purely capacitive with $|Z| \sim 10^{-10}$, a sign that the topcoat is behaving as a pure barrier against the ingress of electrolyte. After some time, the |Z| decreases, a sign that the barrier properties are decreasing and that the electrolyte is starting to penetrate the coating. An intermediate value is reached around $10^9$, and there are some fluctuations in the values (a phenomenon that we have observed when using Mg-rich primers for other systems). It is believed the fluctuations are due to competing processes: decreases in |Z| is sign of a decrease in the barrier properties and subsequent increases in |Z| (while the OCP is decreasing) is a result of the activation of the Mg powder that starts providing cathodic protection.

The experiment was carried on until 2275 hours of exposure, and, at this time, the |Z| was about $10^8$, and half of the panels displayed clean scribes with no accumulation of corrosion products and no blisters away from the scribe.

Example 5

Use of Mg-Rich Primers for Protecting Various Substrates—Effect of Substrate Composition, Binder, Pigment Volume Concentration, and Particle Size and Shape In order to demonstrate that the Mg-rich primers described in International Publication No. WO 2005/051551, which is hereby incorporated by reference, could be used with commercially available binders and are suitable for use on Al alloys other than 2024 T3 and 7075 T6, a two-component Mg-rich primer was applied on Al alloys 5052, 6061, and 2024 (as control) using a commercially available, two-component epoxy-polyamide as binder. The two-component Mg-rich primer was also applied on a titanium alloy (Ti4Al6V).

The coated samples were tested by exposure in a B117 corrosion chamber for about 3000 hours, and, at various times, the exposed samples were characterized (i) visually, (ii) by OCP monitoring, and (iii) by electrochemical impedance spectroscopy.

The samples on the titanium alloy failed during the first week of exposure. It is believed that the low level of protection afforded by the Mg-rich primer was due to a big difference in the open circuit potential between titanium alloy substrate and the Mg particles.

Figure 5A:
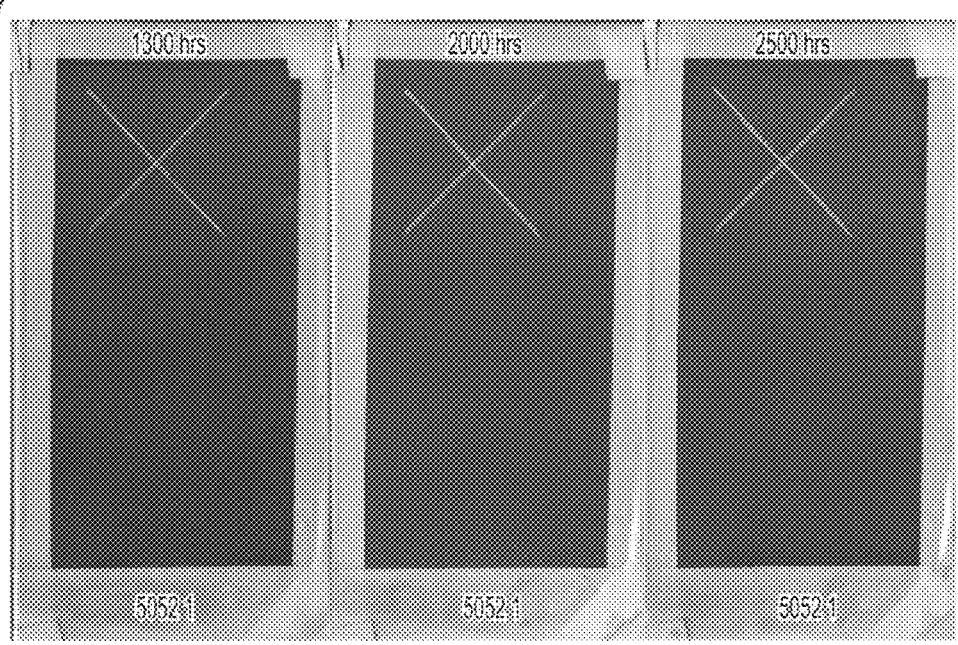
FIGS. 5A and 5B are images of Al 5052 (FIG. 5A) and Al 6061 (FIG. 5B) panels coated with an Mg-rich primer containing a two-component, commercially available epoxy-polyamide binder at various times during exposure in a B117 corrosion chamber.
Figure 5B:
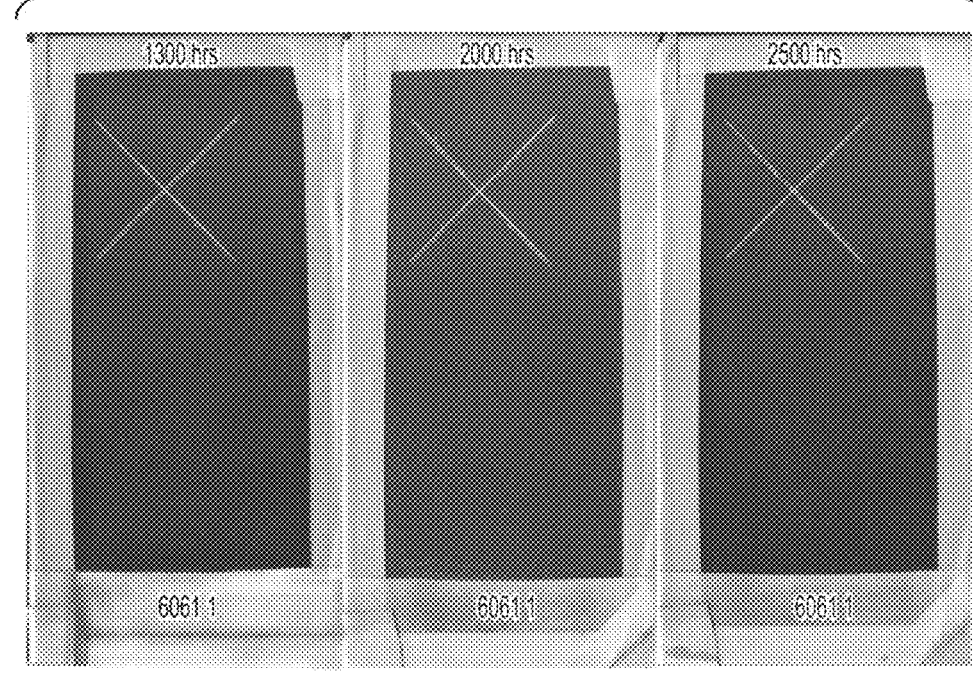
Figure 5C:
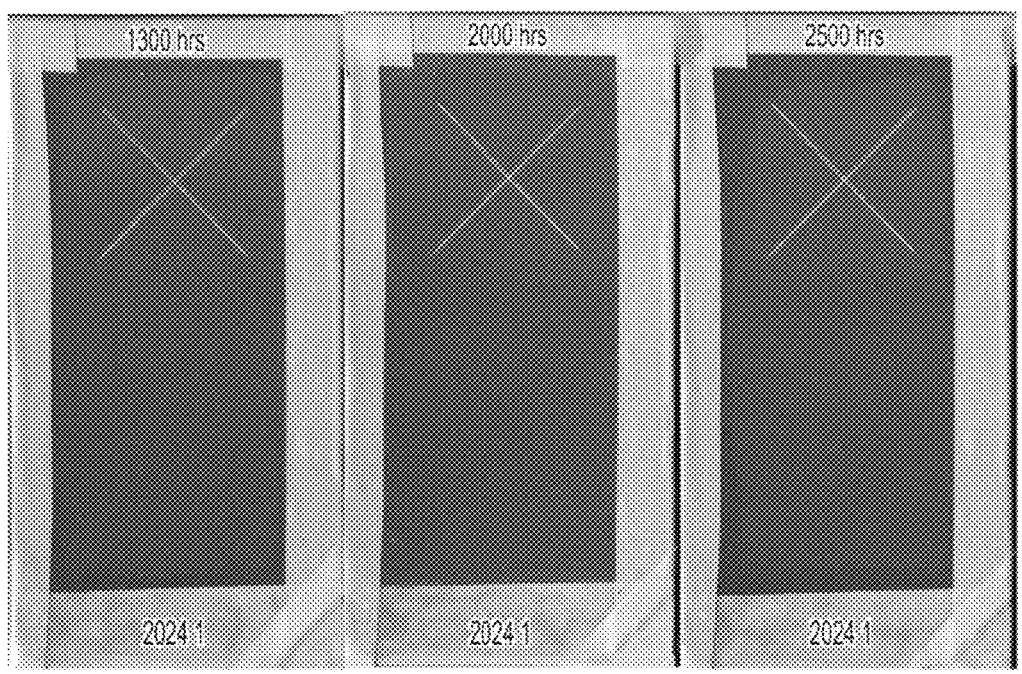
FIGS. 5C and 5D are images of Al 2024 panels protected with Mg-rich primer containing the two-component, commercially available, epoxy-polyamide binder (FIG. 5C) and of Al 2024 panels protected with Mg-rich primer containing a prior silane modified epoxy isocyanate hybrid binder (FIG. 5D) at various times during exposure in a B117 corrosion chamber.
Figure 5D:
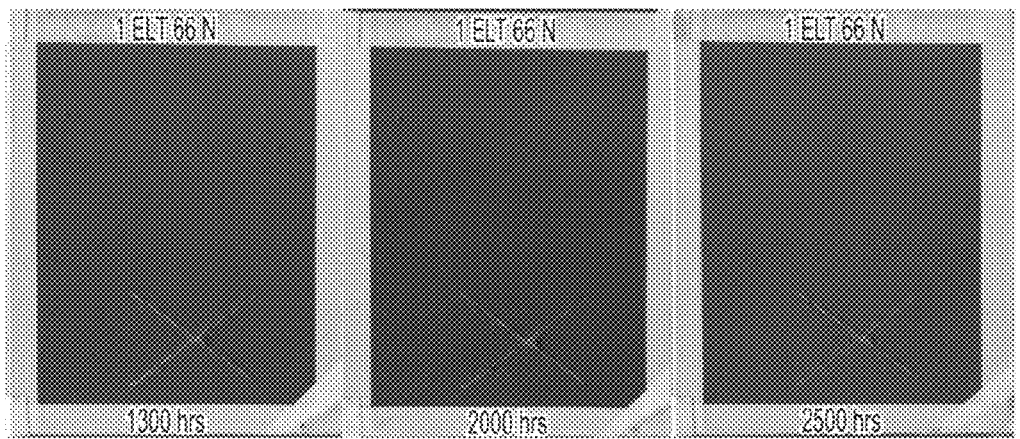

Visual Inspection. Al 5052 (FIG. 5A) and Al 6061 (FIG. 5B) showed performances comparable to the performances previously observed for Al 2024 and Al 7075. Al 2024 panels protected with Mg-rich primer containing the two-component binder (commercially available epoxy-polyamide) (FIG. 5C) showed performances comparable to the performances of Al 2024 panels protected with Mg-rich primer containing the silane modified epoxy isocyanate hybrid binder described in International Publication No. WO 2005/051551, which is hereby incorporated by reference (FIG. 5D).

Figure 5E:
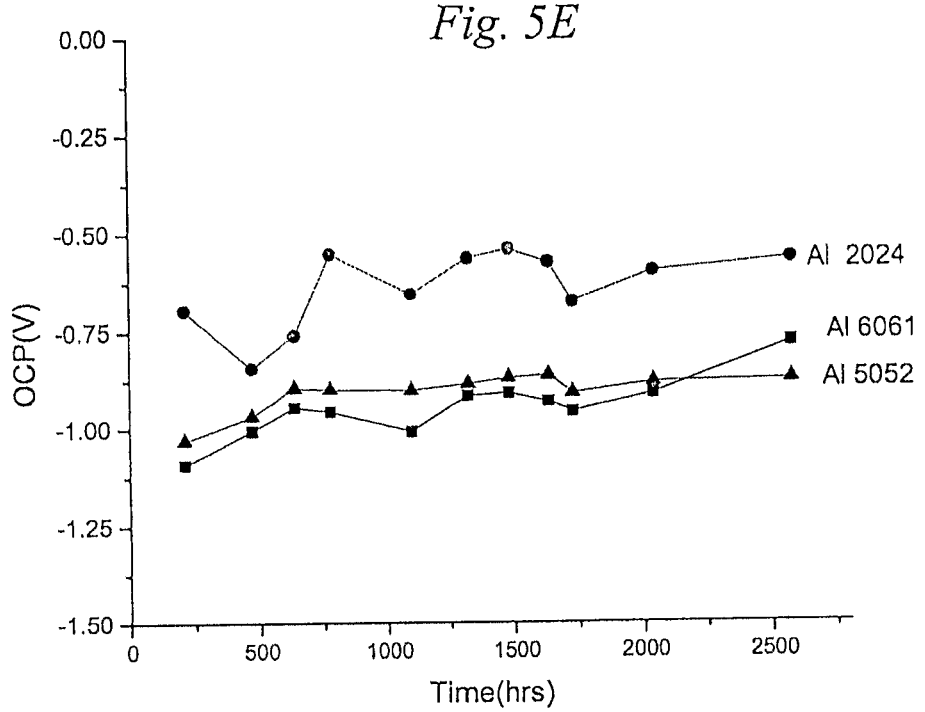
FIG. 5E is a graph showing changes in OCP as a function of immersion time (B117) for topcoated Mg-rich primers containing an epoxy-polyamide binder on Al 2024, Al 5052, and Al 6061 substrates.

OCP Monitoring. The OCP measurement is the most immediate way to understand if the Mg-rich primer provides cathodic protection to the substrate. FIG. 5E shows the evolution of the OCP for the coating system on Al 2024, Al 5052, and Al 6061. For all the substrates, the OCP is shifted on the negative side (cathodic), a sign that the primer is providing cathodic protection. There is a tendency for the OCP to drift towards the value of the bare substrate (about −600 mV for all of the aluminum alloys), and this drift can be controlled by the pigment volume concentration of the primer coating.

EIS Monitoring. Electrochemical impedance spectroscopy ("EIS") was used to characterize the performances of (i) the three sets of samples (Al 2024, Al 5052, and Al 6061) protected with the Mg-rich two-component binder (commercially available epoxy-polyamide) formulation and (ii) the one set of Al 2024 samples protected with the Mg-rich silane modified epoxy isocyanate hybrid binder (described in International Publication No. WO 2005/051551, which is hereby incorporated by reference) formulation. All samples showed low |Z| values after ~1000 hours of exposure and no corrosion after 3000 hours of exposure. The three substrates showed the same EIS behavior. However, the EIS data for the Al 2024 panel using the two-component binder sample ($|Z|\sim 10^5$) differed from the EIS data for the Al 2024 panel using the silane modified epoxy isocyanate hybrid binder ($|Z|\sim 10^8$).

Mg-rich primers using the two-component epoxy-polyamide binder were studied at different pigment volume concentrations ("PVC"). Al 2024 and Al 7075 substrate panels were coated with primers containing two different magnesium particle loadings (PVCs of 33% and 45%). The CPVC for the system was about 50%. The coated samples were tested by exposure in a B117 corrosion chamber for about 3000 hours, and, at various times, the exposed samples were visually characterized. For both the Al 2024 and Al 7075 panels, coatings with 45% PVC primer provided better protection than coatings with 33% PVC primer, which failed by blistering within the first 1000 hours.

Studies were carried out to investigate the effect of Mg particle size and shape on a Mg-rich primers ability to inhibit corrosion. The studies were conducted using magnesium flakes (<10 micron), magnesium powder of about 11 micron, magnesium granules of about 40 micron, and a mixture of magnesium granules (about 40 micron and about 60 micron), In was found that the magnesium granules of about 40 micron and the mixture of magnesium granules (about 40 micron and about 60 micron) provided the best corrosion protection, while the magnesium flakes and 11 micron powder did not protect as well, Interestingly, it was observed that, when magnesium flakes were used, 20% PVC samples outperformed 50% PVC samples.

Example 6

Development of Magnesium Alloy-Rich Primers for Aluminum Substrates

Magnesium alloy particles were used in magnesium-rich primer systems for the protection of aluminum substrates. Three different magnesium alloy particle (AM60, AZ91B, and LNR91 were employed). Particle size and particle size distribution measurements for the three alloys were carried out using a Particle Sizing Systems Inc.'s Nicomp Particle Size Analyzer with acetone as the carrier. The mean, mode, and median of the particle size distribution experiments for each of the three alloys are set forth in Table 2.

TABLE 2

|  | Mean (μm) | Mode (μm) | Median (μm) |
|---|---|---|---|
| AM60 | 63.00 | 63.46 | 60.12 |
| AZ91B | 58.96 | 74.61 | 55.45 |
| LNR91 | 56.21 | 87.72 | 49.78 |

Critical pigment volume concentration ("CPVC") for each of the three alloys was determined experimentally using the equation: $CPVC=[1+(((OA)(\rho))/93.5)]^{-1}$, where $\rho$ is the density (sum of the percentage of Al times density of Al and the percentage of Mg times density of Mg) and where OA is the oil absorption (expressed grams of linseed oil/grams of pigment). OA was measured by adding linseed oil to a known weight of pigment until the point in which just enough oil is present to wet the surface of the pigment particles. The results for each of the three alloys are set forth in Table 3.

TABLE 3

|  | AM60 | AZ91B | LNR91 |
|---|---|---|---|
| Composition | Al 5%, Mg 95% | Al 9%, Mg 91% | Al 50%, Mg 50% |
| Density (ρ) (g/cm³) | 1.79 | 1.85 | 2.22 |
| OA (g/100 g of pigment | 43.76 | 47.04 | 25.94 |
| Theoretical CPVC | 54.41% | 51.79% | 61.88% |
| Experimental CPVC | between 31% and 34% | less than 36% | about 39% |

From the particle size experiments, it is seen that AM60 has a more uniform particle size than AZ91B and LNR91. However, the particle size in general is big, above 60 micrometer, and the particle size distribution of each pigment is fairly broad. SEM experiments showed that the shape of pigment powder is not very well controlled. This fact may be one of the reasons for the big difference between experimental and theoretical CPVC values for this type of system. When interpreting data from experiments carried out with these particles, one needs to bear in mind that the size and shape of the alloy particles were neither well-controlled not optimized.

Figure 6A:
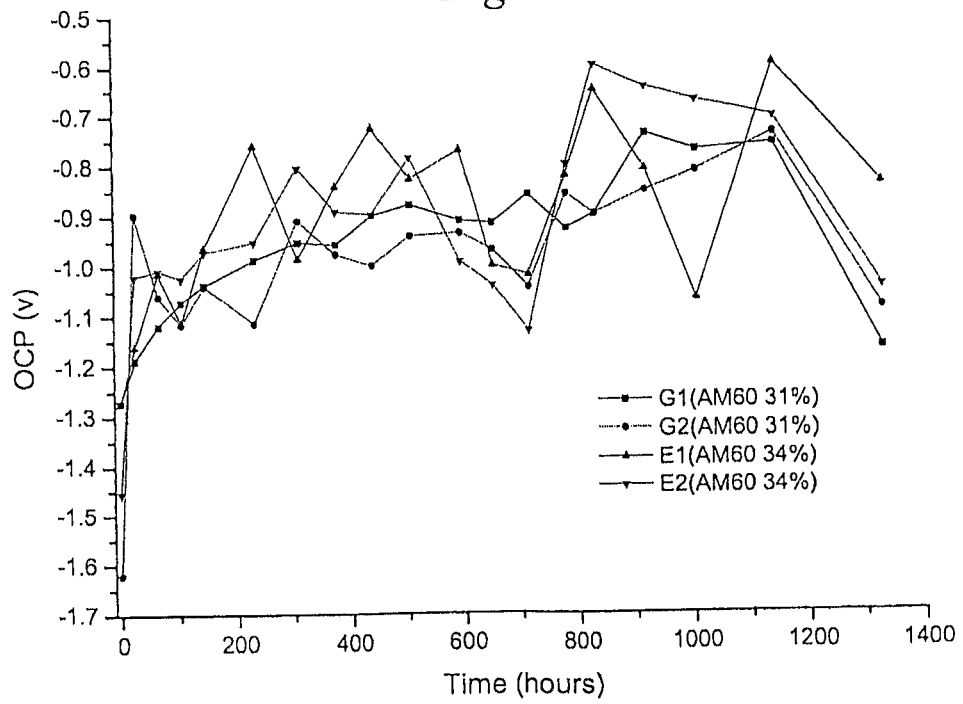
FIGS. 6A, 6B, and 6C are graphs showing the change in OCP as a function of immersion time (B117) for Mg-rich non-topcoated primers made with AM60 (FIG. 6A), AZ91B (FIG. 6B), and LNR91 (FIG. 6C) magnesium alloy particles in a two-component epoxy-polyamide binder.
Figure 6B:
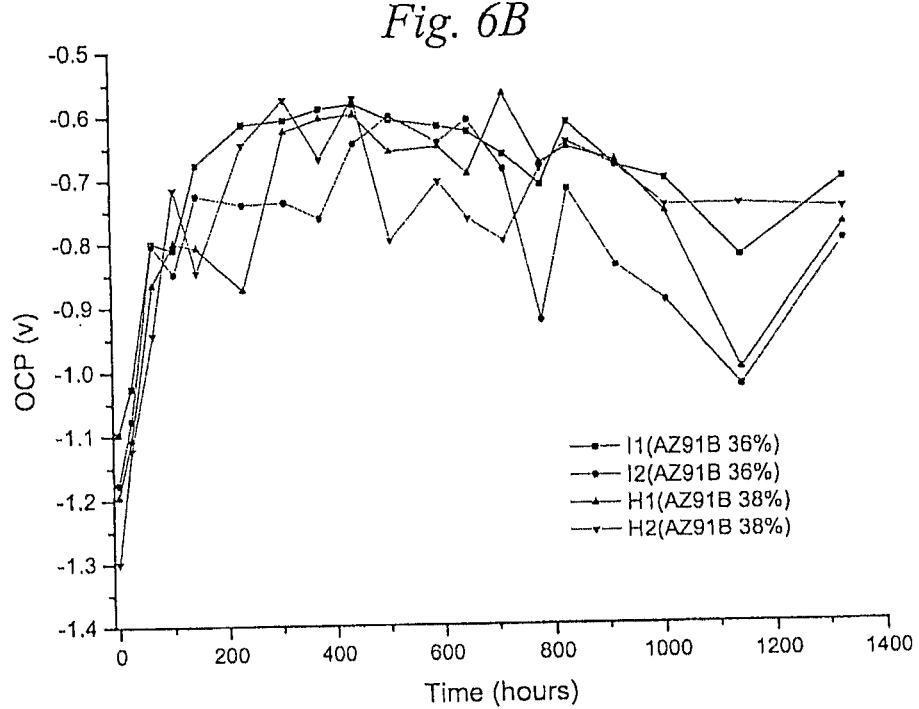
Figure 6C:
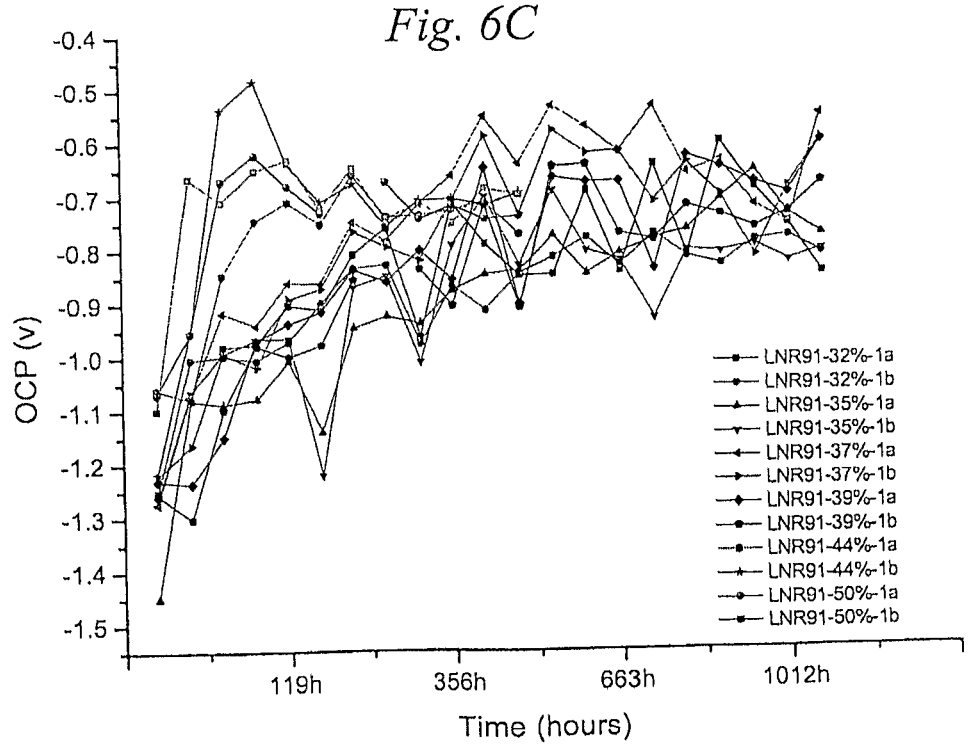
Figure 6D:
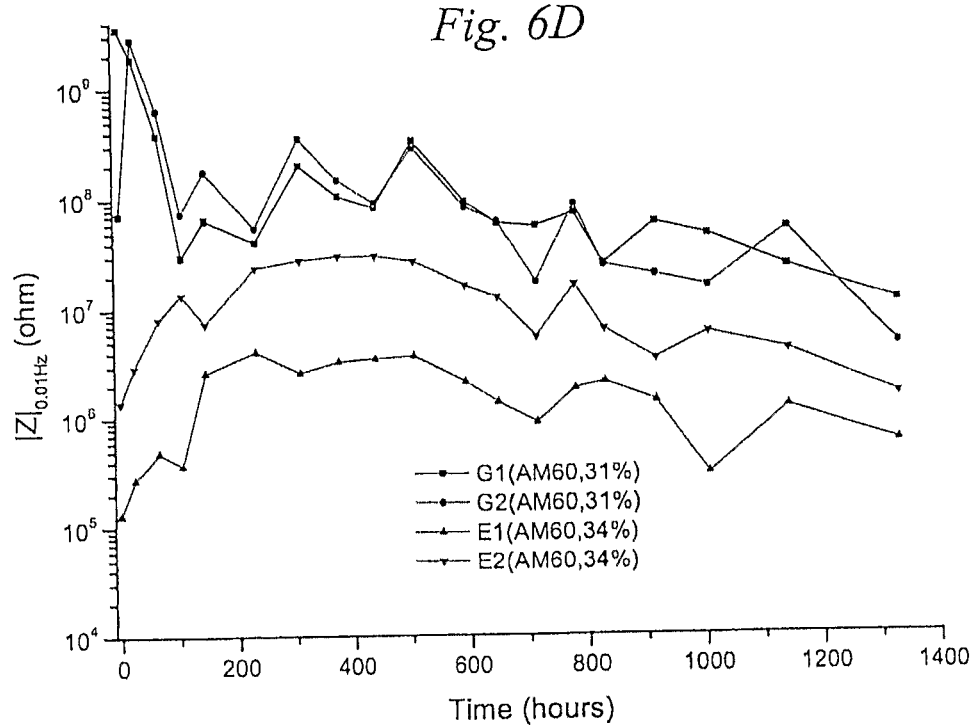
FIGS. 6D, 6E, and 6F are graphs showing the modulus of electrochemical impedance at 0.01 Hz as a function of immersion time (B117) for the AM60-, AZ91B-, and LNR91-containing primers, respectively.
Figure 6E:
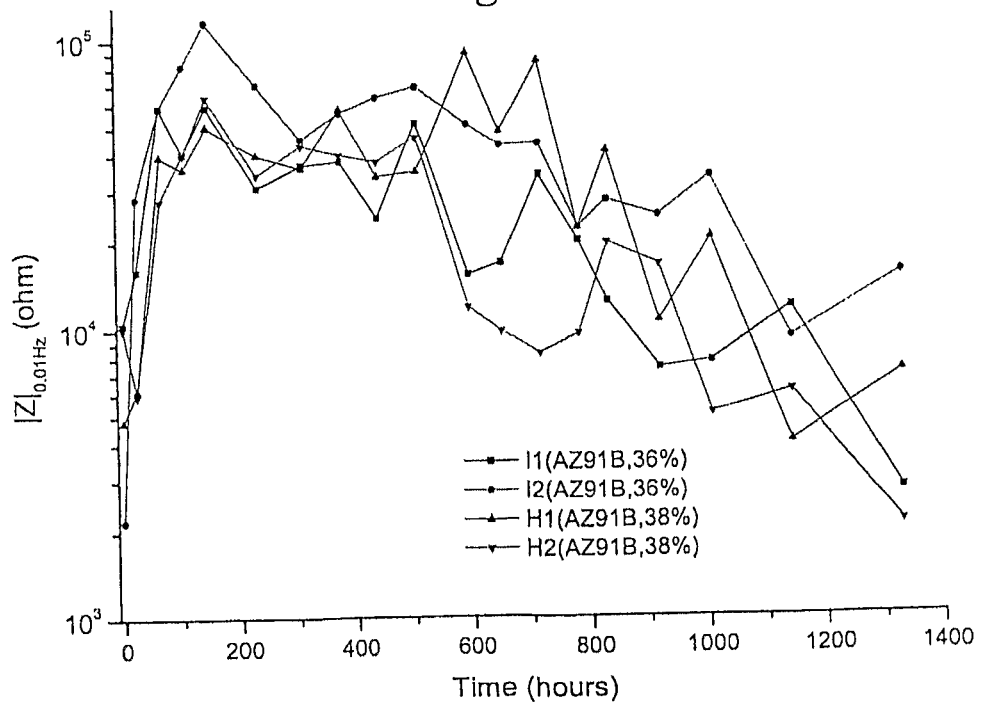
Figure 6F:
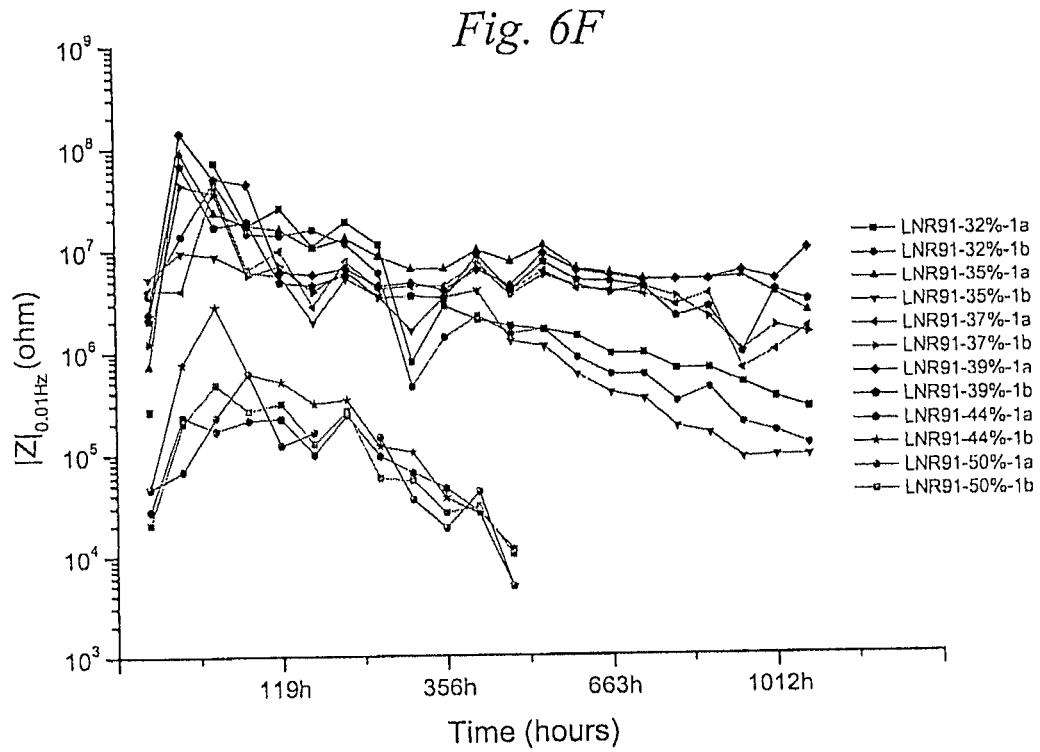

FIGS. 6A, 6B, and 6C show the change in OCP during immersion time (B117) for the Mg-rich primers made with magnesium alloy particles having different aluminum content in a two-component epoxy-polyamide binder (Epon 828 and Ancamide 2453 in a weight ratio of 1.12:1). FIGS. 6D, 6E, and 6F show the modulus of electrochemical impedance at the lowest measured frequency (0.01 Hz) as a function of immersion time (B117) for these primers.

For the AM60 alloy, results from 4 samples are shown (two at 31% PVC and two at 34% PVC). For the AZ91B alloy, results from 4 samples are shown (two at 36% PVC and two at 38% PVC). For the LNR91 alloy, results from 12 samples are shown (two at 32% PVC, two at 35% PVC, two at 37% PVC, two at 39% PVC, two at 44% PVC, and two at 50% PVC). No topcoat was employed in these experiments.

Referring to the results from the OCP experiments (FIGS. 6A-6C), the potential is seen to be fluctuating around −1.0V, with a tendency to drift towards the value of bare aluminum. The fluctuation is thought to be influenced by the broad particle size. Narrowing the particle size distribution of the alloys should result in less OCP fluctuation, and may provide one way to optimize these. AM60 (FIG. 6A) shows a behavior similar to that of pure Mg, even if AM60 exhibits a high degree of fluctuation. Very interesting, but still not fully understood, are the values of OCP that seem to return at more negative levels, suggesting some degree of recovery of the system. This may be due to the presence of fresh granules, which remain protected from the corrosive environment, that become available to establish cathodic protection after many hours of immersion. As the aluminum content increases, the behavior changes slightly. Referring to FIG. 6B, AZ91B, the alloy with about 9% aluminum content, seems to follow the behavior of AM60 with lower signs of the recovery previously mentioned. Referring to FIG. 6C, LNR91/96, the alloy with 50% aluminum content, presents a constant drift from the mixed values (couple Mg—Al) towards the bare Al value, a sign that the amount of protection available is possibly limited.

Turning now to the results presented in FIGS. 6D-6F, it should be noted that the modulus of the electrochemical impedance at the lowest measured frequency is a useful parameter for monitoring the protection behavior of the Mg-rich primer. Referring to FIG. 6D, the behavior of the primer using AM60 as pigment is shown. As mentioned above, the primer was formulated at different PVCs, and the first thing worth mentioning is the different values of the |Z|. As expected, the samples with the higher alloy content present the lower value of |Z|. This may be the result of the lower polymeric content in the systems with higher alloy content, which may, in turn, result in a coating that is more porous and that does not provide high barrier properties. However, the high magnesium alloy load makes the formulas at high PVC the best candidates for providing long term protection via cathodic protection, especially in presence of a topcoat.

Figure 7A:
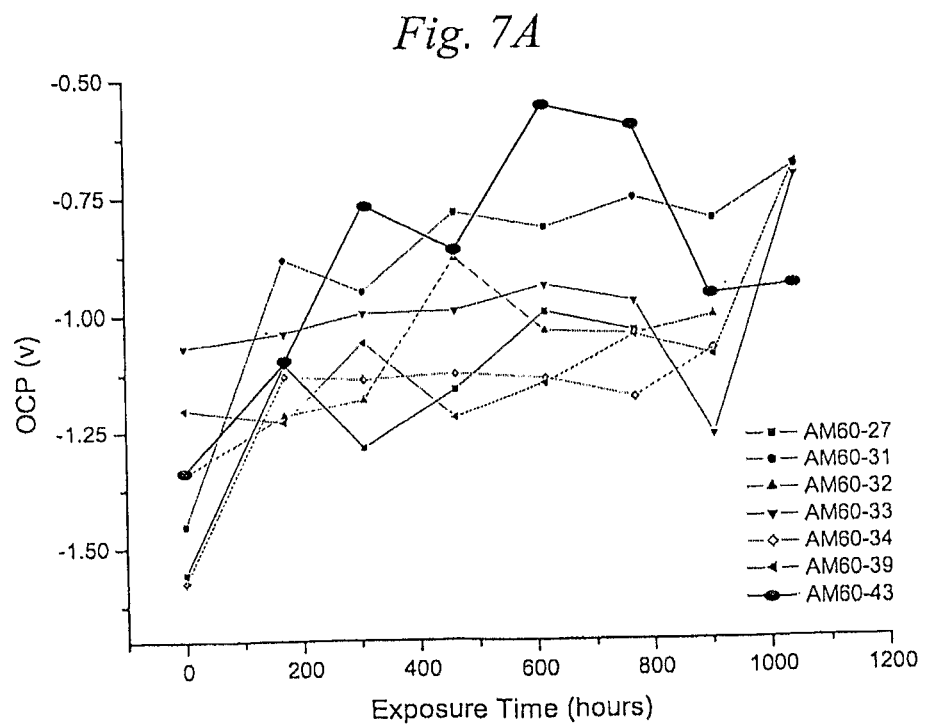
FIGS. 7A and 7B are graphs showing the change in OCP as a function of immersion time (B117) for Mg-rich topcoated primers made with AM60 (FIG. 7A) and AZ91B (FIG. 7B) magnesium alloy particles in a two-component epoxy-polyamide binder.
Figure 7B:
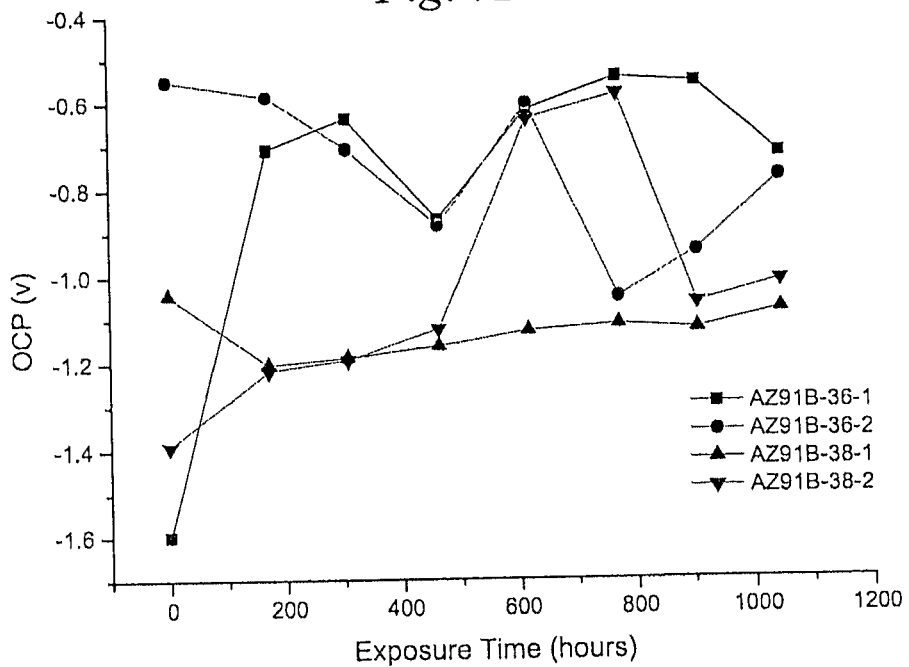
Figure 7C:
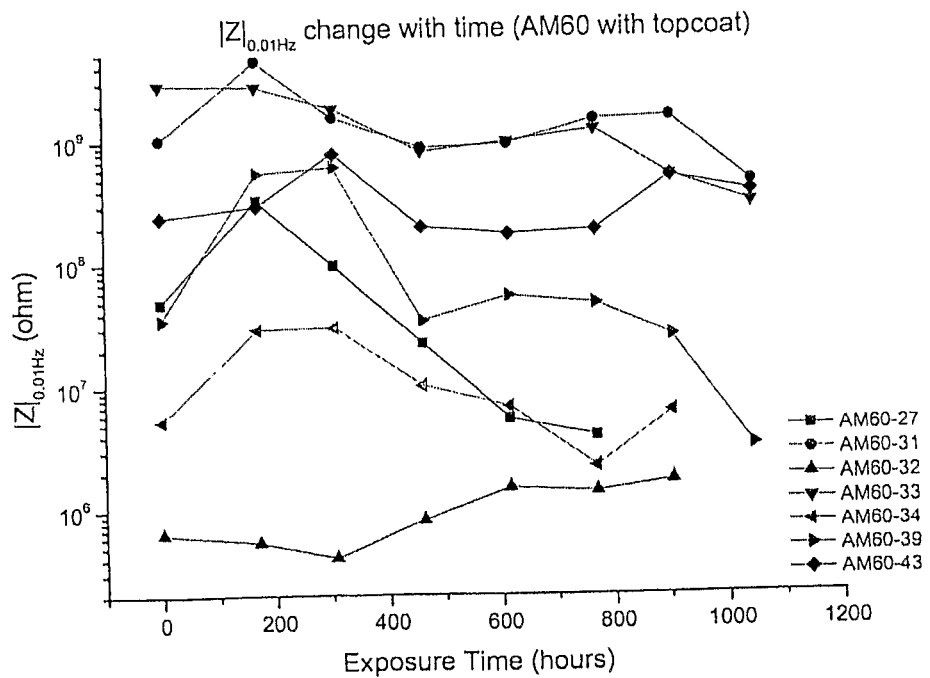
FIG. 7C is a graph showing the modulus of electrochemical impedance at 0.01 Hz as a function of immersion time (B117) for the AM60-containing primer.

As mentioned above, the above OCP and electrochemical impedance experiments were preformed on samples that did not have a topcoat. The OCP and electrochemical impedance experiments were also performed with topcoated samples. FIGS. 7A and 7B show the change in OCP during immersion time (B117) for the Mg-rich primers made with AM60 and AZ91B particles in the two-component epoxy-polyamide binder. FIG. 7C shows the modulus of electrochemical impedance at the lowest measured frequency (0.01 Hz) as a function of immersion time (B117) for the AM60 primers. Topcoated LNR91 samples were not studied because the coarseness of the LNR91 powder yielded samples with a degree of roughness too high to be of relevance. For the AM60 alloy (FIGS. 7A and 7B), results from 7 samples are shown (one each of 27%, 31%, 32%, 33%, 34%, 39%, and 43% PVC). For the AZ91B alloy (FIG. 7C), results from 4 samples are shown (two at 36% PVC and two at 38% PVC).

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method of treating a metal to improve the metal's corrosion resistance, said method comprising:
    applying, to the surface of the metal, a coating which consists essentially of magnesium powder and an inorganic binder,
    wherein the inorganic binder comprises a tetraalkyl orthosilicate; or
    wherein the inorganic binder comprises one or more trialkoxy monoalkyl silanes and one or more tetraalkyl orthosilicates; or
    wherein the inorganic binder comprises two or more trialkoxy monoalkyl silanes and one or more tetraalkyl orthosilicates and wherein at least one of the trialkoxy monoalkyl silanes is an amine-containing trialkoxy monoalkyl silane; or
    wherein the inorganic binder comprises two or more trialkoxy monoalkyl silanes and one or more tetraalkyl orthosilicates and wherein at least one of the trialkoxy monoalkyl silanes is an acrylate-containing or methacrylate-containing trialkoxy monoalkyl silane; or
    wherein the inorganic binder comprises two or more trialkoxy monoalkyl silanes and one or more tetraalkyl orthosilicates and wherein at least one of the trialkoxy monoalkyl silanes is an amine-containing trialkoxy monoalkyl silane and wherein another of the trialkoxy monoalkyl silanes is an acrylate-containing or methacrylate-containing trialkoxy monoalkyl silane.

2. A method according to claim 1, wherein the metal is aluminum or an aluminum alloy.

3. A method according to claim 2, wherein the metal is an aluminum alloy.

4. A method according to claim 3, wherein the aluminum alloy is a copper-containing aluminum alloy.

5. A method according to claim 3, wherein the aluminum alloy is selected from Al 2024, Al 7075, Al 5052, and Al 6061.

6. A method according to claim 1, wherein the trialkoxy monoalkyl silanes and the tetraalkyl orthosilicates are present in a volume ratio of from about 1:10 to about 10:1.

7. A method according to claim 1, wherein the trialkoxy monoalkyl silanes and the tetraalkyl orthosilicates are present in a volume ratio of from about 1:1 to about 10:1.

8. A method according to claim 1, wherein the magnesium powder is a powder of a magnesium alloy comprising (i) magnesium and (ii) calcium, manganese, lithium, carbon, zinc, potassium, aluminum, silicon, zirconium, and/or a rare earth metal.

9. A method according to claim 1, wherein the magnesium powder is a magnesium alloy powder having a corrosion potential that is from about 0.01 volt to about 1.5 volt more negative than the metal's corrosion potential.

* * * * *